(12) United States Patent
Chen et al.

(10) Patent No.: US 12,366,858 B2
(45) Date of Patent: Jul. 22, 2025

(54) DISTANCE CONTROL METHOD AND SYSTEM FOR RELATIVE MOTION BETWEEN SATELLITES

(71) Applicant: Central South University, Changsha (CN)

(72) Inventors: Qifeng Chen, Changsha (CN); Caisheng Wei, Changsha (CN); Yuxin Liao, Changsha (CN); Yunhe Meng, Changsha (CN); Zhaotai Meng, Changsha (CN); Zhuangzhuang Xiong, Changsha (CN)

(73) Assignee: Central South University (CN)

( * ) Notice: Subject to any disclaimer, the term of this patent is extended or adjusted under 35 U.S.C. 154(b) by 305 days.

(21) Appl. No.: 18/095,552

(22) Filed: Jan. 11, 2023

(65) Prior Publication Data

US 2023/0221722 A1  Jul. 13, 2023

(30) Foreign Application Priority Data

Jan. 11, 2022 (CN) .................... CN202210026728.6

(51) Int. Cl.
  *G05D 1/00* (2024.01)
  *B64G 1/24* (2006.01)
  *B64G 3/00* (2006.01)

(52) U.S. Cl.
  CPC ............... *G05D 1/02* (2013.01); *B64G 1/244* (2019.05); *B64G 3/00* (2013.01)

(58) Field of Classification Search
  CPC ............ G05D 1/02; B64G 1/242; B64G 3/00
  See application file for complete search history.

(56) References Cited

U.S. PATENT DOCUMENTS

2017/0341779 A1* 11/2017 Healy ...................... B64G 1/36
2019/0253134 A1*  8/2019 Coleman ............ H04B 7/18519

FOREIGN PATENT DOCUMENTS

RU       2558959 C2 *  8/2015

OTHER PUBLICATIONS

Rong Chen et al., "Gaussian mixture model based fixed-time control for safe proximity to spacecraft with complex shape obstacle," (Year: 2021).*

* cited by examiner

*Primary Examiner* — Scott A Browne
*Assistant Examiner* — Terry C Buse

(57) ABSTRACT

In a distance control method of relative motion between satellites, by reducing the distance between a companion satellite and a reference satellite through the first position relation, and increasing the distance between a companion satellite and a reference satellite according to the second position relation, the distance between satellites can be kept between the set maximum distance and the minimum distance. In this way, on the one hand, the inter-satellite distance cannot be too large to ensure that the two satellites are within the maximum distance range required by communication or other cooperative relations. At the same time, the inter-satellite distance cannot be too small, and further avoid the collision between the two satellites. The method is capable of tolerating the effect of satellite orbit perturbation, allowing the inter-satellite distance to vary naturally between maximum and minimum distances, and thus saving control fuel consumption.

11 Claims, 8 Drawing Sheets

DISTANCE CONTROL METHOD AND SYSTEM FOR RELATIVE MOTION BETWEEN SATELLITES

CROSS REFERENCE TO THE RELATED APPLICATIONS

This application is based upon and claims priority to Chinese Patent Application No. 202210026728.6, filed on Jan. 11, 2022, the entire contents of which are incorporated herein by reference.

TECHNICAL FIELD

The invention relates to the technical field of satellite control, in particular to a distance control method and system of relative motion between satellites.

BACKGROUND

Using one or more deputy satellites to move with the chief satellite, through the cooperation between the chief satellite and the deputy satellites, the ability of the chief satellite can be expanded or the task performance can be improved, or even the tasks that cannot be completed by a single satellite can be achieved, which has become a new mode to complete space missions. For close range multi satellite collaborative tasks, some require strict maintenance of the specified relative motion trajectory between satellites, and some only require loose cluster flight with bounded distance between satellites. For collaborative tasks with strict requirements on relative motion trajectory, since maintaining the specified relative motion requires continuous control and consumes more fuel, it is also necessary to release the constraint on relative motion trajectory outside the collaborative work period and only maintain the loose companion state to save fuel.

The loose cluster flight between satellites requires that the relative motion distance is bounded for a long time, that is, the distance between satellites cannot be greater than a certain maximum value to ensure the feasibility of communication or other cooperation between satellites; The distance between satellites shall not be less than a certain minimum value to avoid collision or other interference between satellites.

By using the simplified model of satellite relative motion law, the bounded relative motion trajectory can be designed, but the perturbation or initial relative motion state deviation will cause the relative motion to deviate from the bounded state. Therefore, the maintenance control of relative motion is also required to maintain the cluster flight with bounded distance for a long time. The existing methods realize the relative motion between satellites with bounded distance by satisfying the matching conditions given under a certain simplified model. These conditions include the initial conditions of closed relative motion based on Clohessy-Wiltshire (CW) equation, the matching conditions of semi major axis (energy) of orbit under the perturbation free model, the matching conditions of average orbital elements, J2 invariant orbit conditions, etc. Among them, the initial condition of closed relative motion and energy matching condition based on CW equation will bring a lot of fuel consumption in long-term maintenance control because of not considering perturbation. Although the method based on the average orbital elements matching condition and J2 invariant orbital condition takes into account the influence of the J2 term of the earth's non spherical perturbation, it can reduce the fuel consumption for maintaining control, but it requires high precision on orbital elements to maintain control accuracy, putting forward high requirements for navigation and control.

It can be seen that the distance maintenance control method of satellite cluster flight based on relative motion state, independent of high-precision orbital elements information, and able to fully consider perturbation effects to save fuel consumption still needs to be solved.

SUMMARY

The invention provides a distance control method and system for the relative motion between satellites in order to solve the problems existing in the prior art, aiming at the distance maintenance control problem of the close distance cluster flight of two satellites in the near orbit.

In order to realize the above purpose, the invention is realized by the following technical scheme:

First, the invention provides a distance control method of relative motion between satellites, wherein it includes:

The reference satellite and the companion satellite are determined, and the LVLH coordinates are established with the reference satellite as the center origin. The LVLH coordinates are divided into U quadrant areas in the set plane, and U is a positive integer;

Determine the instantaneous relative ellipse (IRE) and the coordinates of the IRE center $(x_{ct}, y_{ct})$, and determine Q first target control areas and W second target control areas according to the position relation between the coordinates $(x_{ct}, y_{ct})$ of the IRE center and the U quadrant areas. Both Q and W are positive integers. The instantaneous relative ellipse IRE is used to represent the motion trajectory between the companion satellite and the reference satellite;

The distance between the companion satellite and the reference satellite is reduced according to the first position relation, which is the position relation between the coordinates of the IRE center and the Q first target control areas;

The distance between the companion satellite and the reference satellite is increased according to the second position relation, which is the position relation between the center coordinates of the IRE and the W second target control areas.

Secondly, this application embodiment provides a distance control system for the relative motion between satellites, including a memory, a processor and a computer program stored on the memory and run on the processor. The processor implements the steps of the method described in the first aspect when executing the computer program.

Beneficial Effects

The distance control method of relative motion between satellites provided by the invention reduces the distance between the companion satellite and the reference satellite through the first position relation and increases the distance between the companion satellite and the reference satellite according to the second position relation. In this way, the inter-satellite distance cannot be too large to ensure that the two satellites are within the maximum distance range required by communication or other cooperative relations. At the same time, the inter-satellite distance cannot be too small, and further avoid the collision between the two satellites. The distance control method of the relative motion between satellites provided by the invention only requires the relative motion state information between satellites, and does not need to precisely control the number of satellite orbit elements, thus reducing the requirement of orbit motion measurement accuracy for control implementation and increasing the simplicity of control implementation. The relative motion control strategy was designed based on the geometric law of relative motion under the CW equation. The maximum and minimum distance constraints were satisfied by changing the trend of inter-satellite distance with the relative velocity impulse, and the inter-satellite distance was allowed to change freely within the set range, thus reducing the control frequency and fuel demand. The control strategy can tolerate the effect of perturbation rather than precisely satisfy the bounded relative motion condition under the simplified model, thus avoiding the additional fuel consumption caused by continuous perturbation interference.

BRIEF DESCRIPTION OF THE DRAWINGS

FIG. 7A shows a velocity impulse in the x direction of IRE size adjustment; FIG. 7B shows a velocity impulse in the y direction of the maximum distance control; FIG. 7C shows a velocity impulse in y direction of the minimum distance control;

FIG. 11A shows a velocity impulse in the x direction of IRE size adjustment; FIG. 11B shows a velocity impulse in the y direction of the maximum distance control; FIG. 11C shows a velocity impulse in y direction of the minimum distance control;

DETAILED DESCRIPTION OF THE EMBODIMENTS

The following is a clear and complete description of the technical scheme of the invention. Obviously, the described embodiments are only part of the embodiments of the invention, but not all embodiments. Based on the embodiments of the invention, all other embodiments obtained by ordinary technicians in the field without creative labor fall within the scope of protection of the invention.

Figure 1:
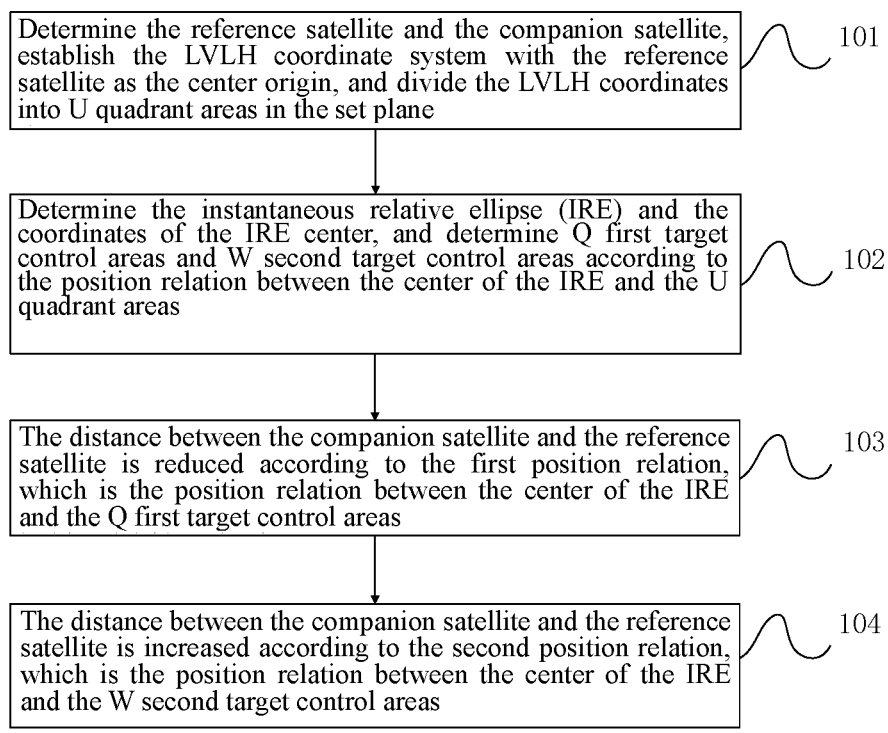
FIG. 1 is a flow chart of a distance control method of relative motion between satellites for preferred embodiment of the invention.

Refer to FIG. 1. This application embodiment provides a distance control method for relative motion between satellites, including:

Step 101. Determine the reference satellite and the companion satellite, establish the LVLH coordinate system with the reference satellite as the center origin, and divide the LVLH coordinates into U quadrant areas in the set plane. U is a positive integer.

In this step, the reference satellite is one of the two satellites in cluster flight. The reference satellite does not exert control and moves along the natural orbit. The companion satellite in this embodiment is the satellite in companion the reference satellite. It can be seen that the distance between the two satellites in this application embodiment is regulated by the control of the companion satellite.

In addition, the construction mode of LVLH coordinate system is consistent with the existing construction mode, which will not be repeated here. Where, the set plane can refer to the x-y plane, namely the orbital plane composed of radial and along-track directions. In other words, only two-dimensional problems in the x-y plane are considered in this application embodiment.

Step 102. Determine the instantaneous relative ellipse (IRE) and the coordinates $(x_{ct}, y_{ct})$ of the IRE center, and determine Q first target control areas and W second target control areas according to the position relation between the coordinates $(x_{ct}, y_{ct})$ of the IRE center and the U quadrant areas. Both Q and W are positive integers. The instantaneous relative ellipse IRE is used to represent the motion trajectory between the companion satellite and the reference satellite.

Step 103. The distance between the companion satellite and the reference satellite is reduced according to the first position relation, which is the position relation between the coordinates of the IRE center and the Q first target control areas.

In this step, Q first target control areas refer to the maximum distance control areas, that is, in this control area, the motion trend between the companion satellite and the reference satellite needs to be adjusted to reduce the distance between the companion satellite and the reference satellite.

Step 104. The distance between the companion satellite and the reference satellite is increased according to the second position relation, which is the position relation between the center coordinates of the IRE and the W second target control areas.

In this step, W second target control areas refer to the minimum distance control area, that is, in this control area, the movement trend between the companion satellite and the reference satellite needs to be adjusted to increase the distance between the companion satellite and the reference satellite.

The above distance control method of relative motion between satellites is applicable to the problem of distance maintenance control of two satellites in close orbit, where the close distance can refer to the distance within kilometers. The distance between the companion satellite and the reference satellite is reduced by the first position relation and increased by the second position relation. In this way, the inter-satellite distance cannot be too large to ensure that the two satellites are within the maximum distance range required by communication or other cooperative relations. At the same time, the inter-satellite distance cannot be too small, and further avoid the collision between the two satellites.

It should be noted that the linearized approximate model of the relative motion of satellites near the near circular reference orbit, called the Clohessy-Wiltshire (CW) equation, can be expressed as:

$$\begin{cases} \ddot{x} = 2\omega\dot{y} + 3\omega^2 x \\ \ddot{y} = -2\omega\dot{x} \\ \ddot{z} = -\omega^2 z \end{cases} \quad (1)$$

This model is based on the two-body motion hypothesis, without considering the influence of perturbation, and describes the free relative motion of the uncontrolled companion satellite relative to the reference satellite in the local-vertical, local-horizontal (LVLH) coordinate system. Where, x,y,z is the coordinate position in the reference satellite LVLH coordinate system; where, $\dot{x},\dot{y}$ is the first derivative of coordinate position with respect to time in the x-y plane; $\ddot{x},\ddot{y},\ddot{z}$ is the second derivative of coordinate position with respect to time; $w=\sqrt{\mu/a_c^3}$ is the average orbital angular velocity of the reference orbit; is the semi-major axis of the reference orbit; $\mu$ is the earth's gravitational constant.

The analytical solution of equation (1) can be expressed as:

$$\begin{cases} x = A \sin \theta_t + x_{ct} \\ y = 2A \cos \theta_t + y_{ct} \\ z = B \cos \varphi_t \end{cases} \quad (2)$$

Where, $\theta_t$, represents the phase of motion in the x-y plane, A represents the amplitude of motion in the x-y plane, $\varphi_t$ represents the phase of motion in the z-axis direction, B represents the amplitude of motion in the z-axis direction, $x_{ct}$ and $y_{ct}$ respectively represents the two coordinates of the relative motion center in the x-y plane;

The geometric parameters of relative motion are as follows:

$$x_{ct} = 4x + 2\dot{y}/\omega = x_{c0} = 4x_0 + 2\dot{y}_0/\omega \quad (3)$$

$$y_{ct} = y - 2\dot{x}/\omega = y_{c0} - \frac{3}{2}x_{c0}\omega t, \; y_{c0} = y_0 - 2\dot{x}_0/\omega$$

$$A = \sqrt{(\dot{x}/\omega)^2 + (3x + 2\dot{y}/\omega)^2} = \sqrt{(\dot{x}_0/\omega)^2 + (3x_0 + 2\dot{y}_0/\omega)^2}$$

$$B = \sqrt{z^2 + (\dot{z}/\omega)^2} = \sqrt{z_0^2 + (\dot{z}_0/\omega)^2}$$

$$\theta_t = \omega t + \theta_0, \; \cos \theta_0 = \frac{\dot{x}_0/\omega}{A}, \; \sin \theta_0 = -\frac{3x_0 + 2\dot{y}_0/\omega}{A}$$

$$\varphi_t = \omega t + \varphi_0, \; \cos \varphi_0 = z_0/B, \; \sin \varphi_0 = -\dot{z}_0/(\omega B)$$

Where, $x_0$, $y_0$ and $z_0$ are respectively the positions of the three coordinate directions at the initial time (t=0). $\dot{x}_0, \dot{y}_0$ and $\dot{z}_0$ are respectively the velocities of the three coordinate directions at the initial time (t=0). Equation (2) shows that the relative motion can be decomposed into two independent motions in the orbital plane (x-y plane) and perpendicular to the orbital plane (z direction). The free relative motion in the x-y plane can be regarded as a dynamic ellipse, that is, an ellipse is determined by the instantaneous parameters at any time. This embodiment is called Instant Relative Ellipse (IRE). The major axis of IRE is along the y-axis and the length of the semi-major axis is 2A; the minor axis of the ellipse is along the x-axis and the length of the semi-minor axis is A; the center coordinate of IRE at the initial time is $(x_{c0},y_{c0})$; the center coordinate of IRE at the time t is $(x_{ct},y_{ct})$; the phase of motion is $\theta_t$; $\theta_0$ represents the phase of motion in the x-y plane at the initial time. The relative motion in the z direction is a simple harmonic vibration, and its amplitude is B; the phase of vibration at the time t is $\theta_t$, and $\theta_0$ represents the motion phase in the z direction at the initial time.

It can be seen that for free relative motion, the magnitude of IRE (represented by the length of the semi-minor axis A) in the x-y plane does not change, and the x coordinate $x_{ct}$ of the center of IRE does not change with time, but $y_{ct}$ changes linearly at a constant rate, and the rate of change is proportional to the absolute value $|x_{c0}|$ of the x coordinate of the center of IRE at the initial time. Therefore, IRE will continue to move along the y-axis at a rate proportional to $|x_{c0}|$.

Figure 2:
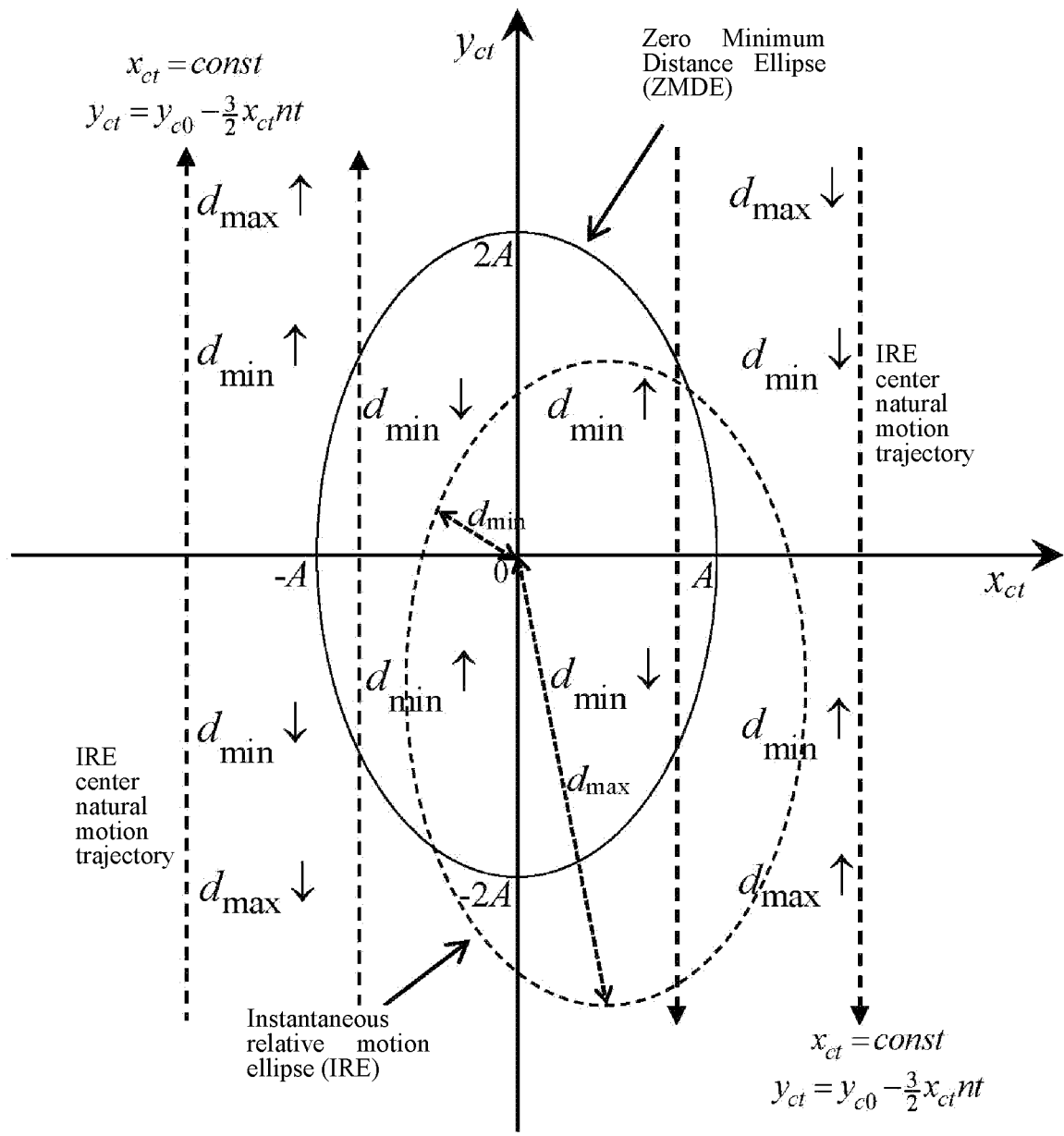
FIG. 2 is a schematic diagram of the trend of trajectory and distance variation in the IRE center phase diagram for the preferred embodiment of the invention.

According to the relative motion law, the motion in the z direction is periodic, and the inter-satellite distance does not change in the long term, while the motion in the x-y plane has both periodic motion and long-term drift along the y axis. Therefore, this embodiment focuses on analyzing the variation law of inter-satellite distance in the x-y plane. The variation trend of relative moving distance in the orbital plane is described as follows:

In this embodiment, only the two-dimensional problem in the x-y plane is considered. The reference satellite is located at the origin of coordinates, and the companion satellite is located on the instantaneous relative motion ellipse with the center $(x_{ct},y_{ct})$ in the reference satellite LVLH coordinate system at time t, the semi major axis in the y-axis direction is 2A, and the semi minor axis in the x-axis direction is A. It is said that the maximum distance from the origin of coordinates to IRE at time t is the maximum IRE distance of two satellites, denoted as $d_{max}$. The minimum distance from the origin of coordinates at time t to IRE is the minimum distance of IRE of two satellites, denoted as $d_{min}(t)$. The dashed ellipse in FIG. 2 is an example of an instantaneous relative motion ellipse on which the corresponding positions of IRE's maximum distance and IRE's minimum distance are marked. Therefore, the actual distance between the two satellites at time t must be between $d_{min}(t)$ and $d_{max}(t)$. When $|x_{ct}|$ is small, the center of IRE changes slowly, and the relative periodic motion between satellites is much faster than the drift of the center of the ellipse. The actual maximum distance and actual minimum distance between satellites will be very close to the maximum distance and minimum distance of IRE respectively. In this case, Maximum IRE distance and IRE minimum distance can well predict the actual maximum and minimum distance between satellites in a period of time, as well as their changing trend.

FIG. 2 is a phase diagram of the change of IRE's center position $(x_{ct},y_{ct})$ in the x-y plane of the reference satellite LVLH coordinate system, where the dotted line with an arrow is the trajectory of IRE's center, and the arrow represents the direction of movement. According to the geometric relationship, when the companion satellite is located near the highest and lowest point of the IRE with a larger distance from the origin, the maximum distance of the IRE between the two satellites reaches the maximum. If the center of IRE is above the x-axis, the highest point of IRE is farther away from the origin; otherwise, the lowest point of IRE is farther away from the origin. According to the trajectory motion law of IRE's central phase diagram, the variation trend of IRE's maximum distance over time is:

$\dot{d}_{max}<0$, when $x_{ct}>0$ and $y_{ct}>0$ $\dot{d}_{max}>0$, when $x_{ct}>0$ and $y_{ct}\leq 0$ $\dot{d}_{max}=0$, when $x_{ct}=0$ $\dot{d}_{max}<0$, when $x_{ct}<0$ and $y_{ct}\leq 0$ $\dot{d}_{max}>0$, when $x_{ct}<0$ and $y_{ct}>0$ \hfill (4)

Where, $\dot{d}_{max}$ represents the derivative of $\dot{d}_{max}$ with respect to time. It can be seen that the variation trend of IRE's maximum distance is determined by the quadrant where IRE's center is located. In FIG. 2, the variation trend of IRE's maximum distance is marked in the four quadrants respectively, where $d_{max}\uparrow$ indicates that IRE's maximum distance increases with time, while $d_{max}\downarrow$ indicates that IRE's maximum distance decreases with time.

On the phase diagram of the movement of the center of IRE, an ellipse is defined with the origin as the center, the x-axis as the minor axis and the semi-minor axis as the length A, the y-axis as the major axis and the semi-major axis as the length 2A. When the center coordinate of IRE is located on the ellipse, IRE passes through the origin, that is, the minimum distance of IRE between satellites is zero. Therefore, this ellipse is called Zero Minimum Distance Ellipse (ZMDE), as shown in the solid line ellipse in FIG. 2. When the center coordinate of IRE is located outside ZMDE, the reference satellite (coordinate origin) is located outside IRE, $d_{min}(t)$ decreases with time when the center of IRE is in the first and third quadrants, and $d_{min}(t)$ increases with time when the center of IRE is in the second and fourth quadrants. When the center of IRE is located within ZMDE, the variation trend of the minimum distance of IRE is opposite to that when the center of IRE is located outside ZMDE in the same quadrant.

The curve equation of ZMDE in the first quadrant is denoted as $y_{ct}=y_{ZUL}(x_{ct})$ and the inverse function of $y_{ZUL}$ ($x_{ct}$) is denoted as $x_{ZUL}(y_{ct})$ where:

$y_{ZUL}(x_{ct})=2\sqrt{A^2-x_{ct}^2}$ ($0\leq x_{ct}\leq A$)

$x_{ZUL}(y_{ct})=\sqrt{A^2-y_{ct}^2/4}$ ($0\leq y_{ct}\leq 2A$) \hfill (5)

Therefore, the minimum distance variation rule of IRE on the phase diagram can be expressed as follows, where $\dot{d}_{min}$ is the derivative of $d_{min}$ with respect to time:

$\dot{d}_{min}<0$, when ($x_{ct}>A$ and $y_{ct}>0$) or ($0<x_{ct}\leq A$ and $y_{ct}>y_{ZUL}(x_{ct})$))

$\dot{d}_{min}>0$, when ($x_{ct}>A$ and $y_{ct}\leq 0$) or ($0<x_{ct}\leq A$ and $y_{ct}\leq -y_{ZUL}(x_{ct})$))

$\dot{d}_{min}<0$, when ($x_{ct}<-A$ and $y_{ct}<0$) or ($-A\leq x_{ct}<0$ and $y_{ct}<-y_{ZUL}(-x_{ct})$))

$\dot{d}_{min}>0$, when ($x_{ct}<-A$ and $y_{ct}\geq 0$) or ($-A\leq x_{ct}<0$ and $y_{ct}\geq y_{ZUL}(-x_{ct})$)

$\dot{d}_{min}=0$, when $x_{ct}=0$ $\dot{d}_{min}>0$, when $0<x_{ct}\leq A$ and $0<y_{ct}\leq y_{ZUL}(x_{ct})$ $\dot{d}_{min}<0$, when $0<x_{ct}\leq A$ and $-y_{ZUL}(x_{ct})<y_{ct}\leq 0$ $\dot{d}_{min}>0$, when $-A\leq x_{ct}<0$ and $-y_{ZUL}(-x_{ct})\leq y_{ct}<0$ $\dot{d}_{min}<0$, when $-A\leq x_{ct}<0$ and $0\leq y_{ct}<y_{ZUL}(-x_{ct})$ \hfill (6)

FIG. 2 shows the variation trend of the minimum distance of IRE when the center of IRE is located in different areas, where, $d_{min}\uparrow$ indicates that the minimum distance of IRE increases with time and $d_{min}\downarrow$ indicates that the minimum distance of IRE decreases with time.

In this embodiment, the objective is to maintain long inter-satellite cluster flights with low fuel consumption, rather than strictly maintain a specific relative geometry. The constraints of cluster flight maintenance are to keep communication or other cooperative relationships between satellites viable and to avoid collisions. The maximum distance between satellites is limited by inter-satellite communication or other cooperative relations, while the minimum distance is limited by collision avoidance constraints.

In the long-term relative motion process between satellites, the perturbation or initial relative motion state deviation may lead to the increase or decrease of the inter-satellite distance. When the inter-satellite distance is too large or too small, in order to maintain the cooperative relationship between the satellites or avoid collision, it is necessary to change the trend of the inter-satellite distance through the control effect. Due to the independence and no drift of the z-direction motion, it can be uncontrolled for stable cluster flight. Therefore, this embodiment only considers the distance control strategy in the x-y plane. According to the above analysis, the variation trend of inter-satellite distance in the x-y plane is determined by the coordinate position of IRE center. Therefore, by changing the position of the center of IRE, the inter-satellite distance can be changed with the desired trend.

According to the expression of IRE center coordinate position in equation (3), the x coordinate $x_{ct}$ of IRE center can be changed by changing the relative motion speed in y direction at time t, but $y_{ct}$ will not be changed. Similarly, the y coordinate $y_{ct}$ of the center of IRE can be changed by changing the relative velocity of motion in the x direction, but $x_{ct}$ will not be changed. In this embodiment, the subscript t represents the value of the variable at time t.

If the adjusted expected values of the x and y coordinates of IRE center at time t are respectively $x_{ct}^+$, and $y_{ct}^+$ the changes in the two coordinates are respectively $\Delta x_{ct}=x_{ct}^+-x_{ct}$ and $\Delta y_{ct}=y_{ct}^+-y_{ct}$, and the corresponding velocity increment in the y direction and the velocity increment in the x direction required at time t are respectively $$\Delta \dot{y}_t = \frac{1}{2}\omega \Delta x_{ct} \hfill (7)$$

$$\Delta \dot{x}_t = -\frac{1}{2}\omega \Delta y_{ct}$$

It can be seen that the required velocity impulse is proportional to the change of IRE center coordinates, and is independent of the current IRE center coordinate position.

In addition, the change of speed will cause the change of dimension A of IRE. It can be obtained from equation (3)

$$A = \sqrt{\frac{1}{4}(y_t - y_{ct})^2 + (x_t - x_{ct})^2} \hfill (8)$$

Where, $x_t$ denotes the x coordinate of the companion satellite position at time t, and $y_t$ denotes the y coordinate of the companion satellite position at time t;

Therefore, when the change in the center position of IRE is $\Delta x_{ct}$ and $\Delta y_{ct}$, the semi-minor axis of IRE after the required velocity increment is applied becomes:

$$A^+ = \sqrt{\frac{1}{4}(y_t - y_{ct} - \Delta y_{ct})^2 + (x_t - x_{ct} - \Delta x_{ct})^2} \quad (9)$$

Optionally, the U quadrant area includes the first quadrant area, the second quadrant area, the third quadrant area and the fourth quadrant area. The distance between the companion satellite and the reference satellite is reduced according to the first position relation, including:

Adjust the IRE center coordinate $x_{ct}$ to $-\text{sign}(x_{ct})\varepsilon_x$ when the center of the instantaneous relative ellipse IRE is in the area of $x_{ct} \leq 0$ and $y_{ct} \geq y_{max}(x_{ct})$, or is in the area of $x_{ct} > 0$ and $y_{ct} \leq -y_{max}(-x_{ct})$, where sign( ) represents the sign function. Where, $y_{max}(x_{ct})$ is the maximum distance boundary function, which is the solution $y_{ct}(x_{ct})$ of the following equation:

$$\max_{-A \leq x_{CT} \leq A} \sqrt{(x_{ct} + x_{cT})^2 + |y_{ct} + y_{ZUL}(x_{cT})|^2} = D_{max}(x_{ct} \leq 0, \ y_{ct} > 0) \quad (10)$$

Figure 3:
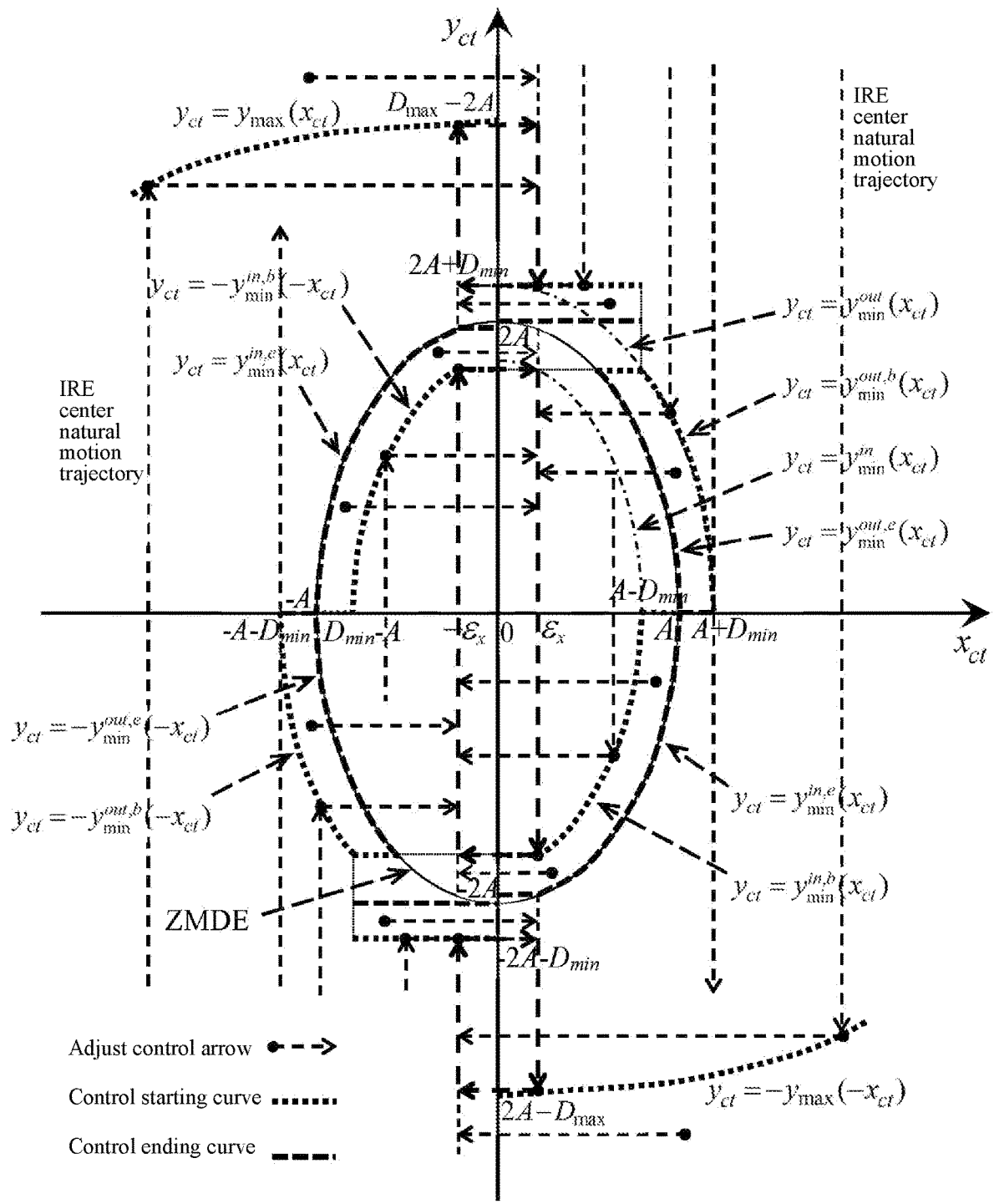
FIG. 3 is a schematic diagram of maximum and minimum distance control strategies on the IRE center phase diagram provided for preferred embodiment of the invention.

The two maximum distance boundary curves $y_{ct}=y_{max}(x_{ct})$ and $y_{ct}=(-x_{ct})$ are represented by dotted lines in FIG. 3.

In this alternative embodiment, the maximum distance between satellites can be controlled by changing the IRE center coordinate position in two ways. One control method is to directly reduce the maximum IRE distance by changing the value of y and adjusting it to the appropriate coordinate position by moving in the opposite direction of the phase diagram trajectory. In order to reduce the frequency of adjustment control, the method needs to adjust $y_{ct}$ to the coordinate position with the same absolute value and the opposite sign when reaching the maximum IRE distance, that is, the coordinate position reaching the maximum IRE distance at the other end of the phase diagram trajectory. Then, as the center of IRE moves along the natural trajectory, the maximum IRE distance first decreases. When the center of IRE crosses the x-axis, the maximum IRE distance begins to increase until it reaches $D_{max}$, and the impulsive control of $y_{ct}$ adjustment needs to be applied again. When is smaller, the required adjustment for $y_{ct}$ is approximately $2(D_{max}-2A)$.

The second way to control the maximum distance between satellites is to exert control to make $\dot{d}_{max} < 0$ when the maximum IRE distance is reached $D_{max}$ and $\dot{d}_{max} > 0$, which can be realized by changing the symbol of $x_{ct}$. As shown in FIG. 3, when the IRE center is located in the second or fourth quadrants and $d_{max}$ increases to the limit threshold $D_{max}$, the symbol of $x_{ct}$ changed by impulsive control makes the IRE center enter the first or third quadrants respectively. The maximum IRE distance will decrease gradually due to the change of trajectory direction of phase diagram. When the subsequent free movement of the center of IRE crosses the x-axis, the maximum IRE distance will gradually increase until $D_{max}$ is reached at the other end of the phase diagram trajectory. At this time, impulse control of changing $x_{ct}$ symbol is needed again.

In order to reduce the impulse control frequency of changing the IRE center coordinate position, the desired drift rate $y_{ct}$ is relatively slow, that is, the required value of $|x_{ct}|$ is small. Therefore, for both control methods, it is necessary to adjust the value of $|x_{ct}|$ to a small amount $\varepsilon_x$, $\varepsilon_x > 0$ first. Thereafter, in the first control method of adjusting $y_{ct}$, the amount of adjustment required for an round trip movement cycle along the phase diagram trajectory is approximately $\Delta y_{ct} = 2(D_{max}-2A)$, and in the second control method of adjusting $x_{ct}$, the amount of adjustment per cycle is $\Delta x_{ct} = 4\varepsilon_x$. According to the adjustment amount of IRE center coordinates required by the two methods, it can be seen from equation (7) that the velocity impulse consumed by the first method is much larger than that of the second method. Therefore, as the preferred implementation method, the maximum distance control method between satellites can be used to adjust the x coordinate of IRE center by impulse and change the trend of the maximum IRE distance by changing the sign of $x_{ct}$.

It should be noted that the maximum distance control strategy in this embodiment assumes $D_{max} > 2A$, because when $2A > D_{max}$, the relative motion amplitude is too large, and the maximum distance between satellites cannot be less than $D_{max}$.

In theory, when $x_{ct}=0$, the center of IRE remains the same, neither $d_{max}$ nor $d_{min}$ changes. However, this is only an ideal case under the CW equation model. In fact, the model has linearization errors and does not consider the effects of various perturbations. In the implementation of control, there are still various uncertainties and errors. Therefore, accurately keeping $x_{ct}=0$ does not guarantee that $d_{max}$ remains unchanged. More importantly, keeping $x_{ct}=0$ accurately all the time under such periodic perturbations as the non spherical J2 term of the Earth will bring a lot of unnecessary fuel consumption. The objective of the adjustment control in this embodiment is not to remain $|x_{ct}|$ at zero, but to adjust to a small value $\varepsilon_x$. The size of $\varepsilon_x$ should be large enough to overcome the perturbation interference, so that the maximum IRE distance still has the variation trend of $\dot{d}_{max} < 0$. Meanwhile, $\varepsilon_x$ should be as small as possible to minimize the drift rate of $y_{ct}$, so that the time interval between the movement of the IRE center along its natural trajectory and the need for the next maximum distance control is as long as possible, thus reducing the frequency of impulse control and the total fuel consumption.

In summary, the maximum distance control strategy is given as follows: when the IRE center is located in the area of $x_{ct} \leq 0$ and $y_{ct} \geq y_{max}(x_{ct})$, or is located in the area of $x_{ct} > 0$ and $y_{ct} \leq -y_{max}(-x_{ct})$, the x coordinate of IRE center is adjusted, and the amount of adjustment is:

$$\Delta x_{ct} = -\text{sign}(x_{ct})(|x_{ct}|+\varepsilon_x) \quad (11)$$

The implementation of this adjustment requires the application of a velocity impulse along the y direction, which is calculated in equation (7).

Optionally, the distance between the companion satellite and the reference satellite is increased according to the second position relation, including:

When the center coordinate of the instantaneous relative ellipse IRE is located in the control area of the first part, adjust $x_{ct}$ in the center coordinate to be the first preset value;

When the center coordinate of the instantaneous relative ellipse IRE is located in the control area of the second part, adjust $x_{ct}$ in the center coordinate to be the second preset value;

Wherein, the control area of the first part is part of the control area of the W second target control area, and the control area of the second part is the remaining control area except the control area of the first part in the W second target control area.

Where, the first preset value is $\varepsilon_x$ and the second preset value is $-\varepsilon_x$. The preset value $\varepsilon_x$ can be selected through simulation test. For example, it can be between 2 m and 3 m to meet the requirements.

Optionally, the W second target control area comprises six control areas, which are the first control area, the second control area, the third control area, the fourth control area, the fifth control area and the sixth control area;

, The starting curve of the first control area is $y_{ct}=2A+D_{min}$, and the ending curve is $y_{ct}=2A$;

The starting curve of the second control area is $y_{ct}=y_{min}^{out,b}(x_{ct})$ and the ending curve is $y_{ct}=y_{min}^{out,e}(x_{ct})$;

The starting curve of the third control area is $y_{ct}=y_{min}^{in,b}(x_{ct})$, and the ending curve is $y_{ct}=y_{min}^{in,e}(x_{ct})$;

The starting curve of the fourth control area is $y_{ct}=-2A-D_{min}$, and the ending curve is $y_{ct}=-2A$;

The starting curve of the fifth control area is $y_{ct}=-y_{min}^{out,b}(-x_{ct})$, and the ending curve is $y_{ct}=-y_{min}^{out,e}(-x_{ct})$;

The starting curve of the sixth control area is $y_{ct}=-y_{min}^{in,b}(-x_{ct})$, and the ending curve is $y_{ct}=-y_{min}^{in,e}(-x_{ct})$;

Where, A represents the semi-minor axis length of IRE, $D_{min}$ represents the minimum safe distance between two satellites set, $y_{min}^{out,b}(x_{ct})$ represents the function defining the minimum distance control starting curve outside ZMDE, $y_{min}^{out,e}(x_{ct})$ represents the function defining the minimum distance control ending curve outside ZMDE, $y_{min}^{in,b}(x_{ct})$ represents the function defining the minimum distance control in e starting curve inside ZMDE, $y_{min}^{in,e}(x_{ct})$ represents the function defining the minimum distance control ending curve inside ZMDE.

Optionally, the distance between the companion satellite and the reference satellite is increased according to the central coordinate of the ellipse IRE and the second position relation of the W control areas, including:

When the center coordinate of the ellipse IRE is located in the first control area, the third control area or the fifth control area, adjust $x_{ct}$ in the center coordinate to be the first preset value;

When the center coordinate of the ellipse IRE is located in the second control area, the fourth control area or the sixth control area, adjust $x_{ct}$ in the center coordinate to be the second preset value.

In this alternative embodiment, it is stated that to avoid collisions, the IRE minimum distance $d_{min}$ is controlled so that it is not less than the given threshold value $D_{min}$. Since the minimum distance between satellites depends on the distance between the center of IRE and ZMDE. Therefore, the minimum distance between the satellites can be controlled by adjusting the coordinate position of IRE center to avoid it being too close to ZMDE.

When the minimum IRE distance $d_{min}$ between satellites is reduced to close to $D_{min}$, the impulse control mode of changing the sign of x coordinate $x_{ct}$ of IRE center is used to make the value of $\dot{d}_{min}$ change from negative to positive to limit the minimum distance between satellites. At the same time, a smaller x coordinate value is adopted for the target position of IRE center, that is $|x_{ct}^+|=\varepsilon_x$, to reduce the adjusted drift rate of IRE center y coordinate, thus reducing the frequency of impulse control. Therefore, the minimum distance control strategy depends on the location of the IRE center. According to the motion law of phase diagram of IRE center coordinates, when $x_{ct} \geq A+D_{min}$ or $x_{ct} \leq -A-D_{min}$, the minimum IRE distance $d_{min}$ will not be less than $D_{min}$, so there is no need to control it. When the center of IRE is located in the ZMDE of the first and third quadrants, $\dot{d}_{min}>0$, the distance between satellites will gradually increase, so that minimum distance control can be unnecessary. When the IRE center is outside the ZMDE in the first or third quadrants, and inside the ZMDE in the second or fourth quadrants, $\dot{d}_{min}<0$, control needs to be applied as $d_{min}$ decreases close to $D_{mm}$ to avoid collisions.

The boundary curve with the nearest distance $D_{min}$ between the first quadrant ZMDE and ZMDE is defined as $y_{ct}=y_{min}^{out}(x_{ct})$, where $y_{min}^{out}(x_{ct})$ is the solution $y_{ct}(x_{ct})$ of the following equation:

$$\min_{0 \leq x_{cT} \leq A} \sqrt{(x_{ct} - x_{cT})^2 + (y_{ct} - y_{ZUL}(x_{cT}))^2} = D_{min} \quad (12)$$

where $(0 \leq x_{ct} \leq A, y_{ct} > y_{ZUL}(x_{ct}))$ or $(A < x_{ct} \leq A + D_{min}, y_{ct} \geq 0)$ When $A>D_{min}$, the boundary curve with the nearest distance $D_{min}$ from ZMDE in the first quadrant ZMDE is defined as $y_{ct}=y_{min}^{in}(x_{ct})$, where $y_{min}^{in}(x_{ct})$ is the solution $y_{ct}(x_{ct})$ of the following equation:

$$\min_{0 \leq x_{cT} \leq A} \sqrt{(x_{ct} - x_{cT})^2 + (y_{ct} - y_{ZUL}(x_{cT}))^2} = D_{min} \quad (13)$$

where $(0 \leq x_{ct} \leq A - D_{min}, 0 \leq y_{ct} < y_{ZUL}(x_{ct}))$

The two boundary curves are represented by dotted lines in FIG. 3.

The designed IRE minimum distance control strategy includes the $x_{ct}$ adjustment in the following six IRE central control areas.

The first control area: $0 \leq x_{ct} \leq x_{ct}^b$ and $2A < y_{ct} \leq 2A+D_{min}$ where $x_{ct}^b$ satisfies the following relation:

$$x_{ct}^b = \begin{cases} (y_{min}^{out})^{-1}(y_{min}^{in}(\varepsilon_x)), & \text{if } A > D_{min} \\ A + D_{min} & \text{otherwise} \end{cases} \quad (14)$$

According to the law of the natural trajectory of IRE center moving along the y-axis, define the boundary of IRE center entering this area as the control starting curve of this area, that is $y_{ct}=2A+D_{min}$, and define the boundary of IRE center leaving this area as the control ending curve of this area, that is $y_{ct}=2A$. When the IRE center is located within this control area, the minimum distance control strategy is: adjust $x_{ct}$ to $-\varepsilon_x$.

Second control area: $x_{ZUL}(y_{min}^{in}(\varepsilon_x)) \leq x_{ct} \leq A+D_{min}$ and $y_{min}^{out,e}(x_{ct}) < y_{ct} \leq y_{min}^{out,b}(x_{ct})$, where:

$$y_{min}^{out,b}(x_{ct}) = \begin{cases} y_{min}^{in}(\varepsilon_x), & \text{if } x_{ZUL}(y_{min}^{in}(\varepsilon_x)) \leq x_{ct} \leq (y_{min}^{out})^{-1}(y_{min}^{in}(\varepsilon_x)) \\ y_{min}^{out}(x_{ct}), & \text{if } (y_{min}^{out})^{-1}(y_{min}^{in}(\varepsilon_x)) < x_{ct} \leq A + D_{min} \end{cases} \quad (15)$$

and $$y_{min}^{out,e}(x_{ct}) = \begin{cases} y_{ZUL}(x_{ct}), & \text{if } x_{ZUL}(y_{min}^{in}(\varepsilon_x)) \leq x_{ct} \leq A \\ 0, & \text{if } A < x_{ct} \leq A + D_{min} \end{cases} \quad (16)$$

The control area is valid only when $A>D_{min}$. The control starting curve of the control area is $y_{ct}=y_{min}^{out,b}(x_{ct})$, and the control ending curve is $y_{ct}=y_{min}^{out,e}(x_{ct})$. When the IRE center is located within this control area, the minimum distance control strategy is: adjust $x_{ct}$ to $\varepsilon_x$.

Third control area: $0 \leq x_{ct} \leq A$ and $y_{min}^{in,e}(x_{ct}) < y_{ct} \leq y_{min}^{in,b}(x_{ct})$, where:

$$y_{min}^{in,b}(x_{ct}) = \begin{cases} -y_{min}^{in}(\varepsilon_x), & \text{if } 0 \leq x_{ct} \leq \varepsilon_x \\ -y_{min}^{in}(x_{ct}), & \text{if } \varepsilon_x < x_{ct} \leq A - D_{min} \\ 0, & \text{if } A - D_{min} < x_{ct} \leq A \end{cases} \quad (17)$$

and $$y_{min}^{in,e}(x_{ct}) = \begin{cases} -y_{ZUL}(\varepsilon_x), & \text{if } 0 \leq x_{ct} \leq \varepsilon_x \\ -y_{ZUL}(x_{ct}), & \text{if } \varepsilon_x < x_{ct} \leq A \end{cases} \quad (18)$$

The control area is valid only when $A > D_{min}$. The control starting curve of the control area is $y_{ct} = y_{min}^{in,b}(x_{ct})$, and the control ending curve is $y_{ct} = y_{min}^{in,e}(x_{ct})$. When the IRE center is located within this control area, the minimum distance control strategy is: adjust $x_{ct}$ to $-\varepsilon_x$.

Fourth control area: $0 > x_{ct} \geq -x_{ct}^b$ and $-2A > y_{ct} \geq -2A - D_{min}$. The control starting curve of the area is $y_{ct} = -2A - D_{min}$, and the control ending curve is $y_{ct} = -2A$. When the IRE center is located within this control area, the minimum distance control strategy is: adjust $x_{ct}$ to $\varepsilon_x$.

Fifth control area: $-x_{ZUL}(y_{min}^{in}(\varepsilon_x)) \geq x_{ct} \geq -A - D_{min}$ and $-y_{min}^{out,e}(-x_{ct}) > y_{ct} \geq y_{min}^{out,b}(-x_{ct})$.

The control area is valid only when $A > D_{min}$. The control starting curve of the control area is $y_{ct} = y_{min}^{out,b}(-x_{ct})$, and the control ending curve is $y_{ct} = y_{min}^{out,e}(-x_{ct})$. When the IRE center is located within this control area, the minimum distance control strategy is: adjust $x_{ct}$ to $-\varepsilon_x$.

Sixth control area: $0 > x_{ct} \geq -A$ and $-y_{min}^{in,e}(-x_{ct}) > y_{ct} \geq -y_{min}^{in,b}(-x_{ct})$. The control area is valid only when $A > D_{min}$. The control starting curve of the control area is $y_{ct} = y_{min}^{in,b}(-x_{ct})$, and the control ending curve is $y_{ct} = y_{min}^{in,e}(-x_{ct})$. When the IRE center is located within this control area, the minimum distance control strategy is: adjust $x_{ct}$ to $\varepsilon_x$.

The six control areas and their boundary curves are shown in FIG. 3. The corresponding adjustment target and direction of the minimum distance control strategy are represented by the horizontal virtual arrow line marked with a dot at the beginning of the line in FIG. 3. The arrow in the figure points to the target position of the IRE center adjustment, and the dot at the beginning of the arrow line indicates the position of the IRE center before the adjustment. The dotted lines in the figure represent the various control starting curves, and the square dotted lines in the figure represent the various control ending curves. The vertical virtual arrow line in the figure represents the natural track of movement in the center of IRE. It should be noted that, in order to be more comprehensive, the minimum distance control strategy diagram given in FIG. 3 is for the case of $A > D_{min}$. When $A \leq D_{min}$, the third control area and the sixth control area do not exist, and the corresponding control strategy of the second control area and the fifth control area is invalid.

For the minimum distance control strategy in the above control areas, the x coordinate adjustment of IRE center on the control starting curve is used to immediately change the position of IRE center when it reaches the curve along the trajectory of the phase diagram, so as to ensure $d_{min} \geq -D_{min}$ after adjustment and change $\dot{d}_{min}$ from negative to positive. While the x coordinate adjustment of IRE center in the area between the control starting curve and the control ending curve cannot guarantee that the inter-satellite distance is less than $D_{min}$, but it can make $\dot{d}_{min} > 0$, so that the relative motion can be automatically out of the collision danger zone.

It is worth noting that there are four smaller risk areas on the phase diagram of the IRE center motion:

$$0 \leq x_{ct} < x_{ct}^b \text{ and } y_{ct}^b(x_{ct}) \leq y_{ct} \leq 2A; \quad (1)$$

$$0 \leq x_{ct} \leq \varepsilon_x \text{ and } -y_{ZUL}(x_{ct}) \leq y_{ct} < -y_{ZUL}(\varepsilon_x); \quad (2)$$

$$0 \geq x_{ct} > -x_{ct}^b \text{ and } -y_{ct}^b(-x_{ct}) \geq y_{ct} \geq -2A; \quad (3)$$

$$0 \geq x_{ct} \geq -\varepsilon_x \text{ and } y_{ZUL}(-x_{ct}) \geq y_{ct} > y_{ZUL}(\varepsilon_x); \quad (4)$$

Where:

$$y_{ct}^b(x_{ct}) = \begin{cases} y_{ZUL1}(x_{ct}), & \text{if } A > D_{min} \\ y_{ZUL0}(x_{ct}), & \text{otherwise} \end{cases} \quad (19)$$

$$y_{ZUL1}(x_{ct}) = \begin{cases} y_{ZUL}(x_{ct}), & \text{if } 0 \leq x_{ct} \leq x_{ZUL}(y_{min}^{in}(\varepsilon_x)) \\ y_{min}^{in}(\varepsilon_x), & \text{if } x_{ZUL}(y_{min}^{in}(\varepsilon_x)) < x_{ct} \leq (y_{min}^{out})^{-1}(y_{min}^{in}(\varepsilon_x)) \end{cases}$$

$$y_{ZUL0}(x_{ct}) = \begin{cases} y_{ZUL}(x_{ct}), & \text{if } 0 \leq x_{ct} \leq A \\ 0, & \text{if } A < x_{ct} \leq A + D_{min} \end{cases}$$

When the center of IRE is located in these four small areas, the distance between the center of IRE and ZMDE will be less than $D_{min}$ along the natural trajectory of the phase diagram motion, that is, the collision between satellites may occur. The minimum IRE distance control is not applied in these four small risk areas. On the one hand, it is not guaranteed to avoid collision after adjusting $x_{ct}$ to $\pm \varepsilon_x$ when IRE center is located in these risk areas. On the other hand, the IRE center will not return to these four low-risk areas after leaving them along the natural trajectory according to the phase diagram trajectory motion and control strategy design. Therefore, other emergency reactive collision avoidance control methods can be used in practical applications. The IRE center can be moved away from these four low-risk areas without collision, thus simplifying the minimum distance control strategy.

According to the definition of trajectory movement trend and minimum distance control strategy in the phase diagram of IRE center, as long as the center of IRE is located in the safe area on the phase diagram initially, the minimum distance control strategy can ensure that the center of IRE is always located in the safe area at all times thereafter, that is, $d_{min} \geq D_{min}$ can be maintained. Among them, the safe area in the IRE center phase diagram is the area whose distance from ZMDE is greater than $D_{min}$ and outside the above four risk areas without minimum distance control.

If $A \leq D_{min}$, and the IRE center is located in the area less than $D_{min}$ away from ZMDE, the above minimum distance control strategy of the second control area, the third control area, the fifth control area and the sixth control area is invalid and $d_{min} > D_{min}$ cannot be realized in time. At this point, the control of adjusting IRE size is used to make $A > D_{min}$, and then the above minimum distance control strategy can be applied.

Optionally, before reducing the distance between the companion satellite and the reference satellite according to the first position relation, the method also includes:

Determine the first target time period to perform a reduction in the distance between the companion satellite and the reference satellite and the second target time period to perform an increase in the distance between the companion satellite and the reference satellite. In the first target time period and the second target time period, the change in the size of the instantaneous relative ellipse IRE resulting from the adjustment of the center coordinates of the instantaneous relative ellipse IRE is within a preset range;

The distance between the companion satellite and the reference satellite is reduced according to the first position relation, including:

Reduce the distance between the companion satellite and the reference satellite during the first target time period;

The distance between the companion satellite and the reference satellite is increased according to the second position relation, including:

The distance between the companion satellite and the reference satellite is increased during the second target time period.

It should be noted that the reduction or increase of inter-satellite distance is realized by changing the trend of inter-satellite distance variation. The reduction or increase referred to in this application embodiment cannot directly cause the sudden increase or decrease of the distance, which will continue for a period of time with natural motion. Therefore, in this application embodiment, the inter-satellite distance can be increased or decreased by adjusting the distance variation trend. In this application embodiment, the timing of the maximum distance control and the minimum distance control, i.e., the execution period, are determined according to the condition that the adjusted IRE size cannot be increased or decreased in order to ensure that changes in the adjusted IRE size do not affect the realization of the control objectives.

The time of maximum distance control, that is, the requirement of the first target time period, is that the size of IRE cannot be increased after adjustment. The timing of minimum distance control, that is, the second target time period, has two conditions: when the target position of IRE center adjustment control is within ZMDE, the size of IRE is required not to be reduced; when the target position of IRE center adjustment control is outside the ZMDE, the size of the IRE is required not to be increased. If the size of IRE cannot be reduced after adjustment, the condition of equation (24) must be satisfied before the control can be performed. If the size of IRE cannot be increased, the control can only be performed if both equations (26) and (27) are satisfied.

In addition, it is worth noting that the magnitude of the IRE can be changed by changing the IRE center coordinates, namely, the length A of the semi-minor axis. According to equations (8) and (9), in order to achieve the same change of A, the change $\Delta x_{ct}$ required for adjusting the x coordinate of IRE center is smaller than the change $\Delta y_{ct}$ required for adjusting the y coordinate of IRE center. According to equation (7), the velocity impulse required to achieve the same $\Delta x_{ct}$ and $\Delta y_{ct}$ is the same, so it is more fuel saving to adjust the size of IRE ellipse by implementing the x coordinate change $\Delta x_{ct}$ of IRE center. However, when $|x_{ct}|$ is small, applying $\Delta x_{ct}$ in order to change A will increase $|x_{ct}|$, causing $\Delta y_{ct}$ to drift faster, which will bring additional control fuel consumption. Therefore, in this embodiment, $\Delta y_{ct}$ is applied to adjust the size of IRE, with $\Delta x_{ct}=0$.

Set the size of IRE before adjustment as A, and the size of IRE after adjustment as $A^+=A_d$. When $\Delta x_{ct}=0$, the equation can be obtained according to equations (8) and (9) as follows:

$$\Delta y_{ct}^2 - 2\bar{y}_t \Delta y_{ct} + 4(A^2 - A_d^2) = 0 \tag{20}$$

Where, $\bar{y}_t$ represents the y coordinate of the companion satellite with respect to the center of IRE, and $A_d$ represents the desired length of the semi-minor axis of IRE after adjustment;

Where, $\bar{y}_t = y_t - A_{ct}$. The smaller of $|\Delta y_{ct}|$ is taken from the two roots of equation (20), and the adjustment of y coordinate of IRE center can be obtained as $$\Delta y_{ct} = -\text{sign}(\bar{y}_t)\left(\sqrt{|\bar{y}_t|^2 + 4(A_d^2 - A^2)} - |\bar{y}_t|\right) \tag{21}$$

When $A > A_d$, in order to ensure the existence of the solution given by equation (21), the following conditions should be satisfied:

$$|\bar{y}_t| \geq 2\sqrt{A^2 - A_d^2} \tag{22}$$

Since the maximum value of $|\bar{y}_t|$ is 2A, there is always an implementation time of $\Delta y_{ct}$ satisfying the condition of equation (22) to reduce the size of IRE.

According to equation (21), $d|\Delta y_{ct}|/d|\bar{y}_t| < 0$. Therefore, when $|\bar{y}_t|=2A$, i.e. $x_t - x_{ct}=0$, IRE size adjustment is implemented, and $|\Delta y_{ct}|$ needs the minimum adjustment, and the adjustment amount of y coordinate of IRE center is:

$$\Delta y_{ct} = -2(A_d - A) \cdot \text{sign}(\bar{y}_t) \tag{23}$$

This minimum-fuel adjustment strategy can be used in non-emergency situations.

When $2A > D_{max}$, no matter where the IRE center is located in the phase diagram, the control must be implemented to reduce the size of the IRE, that is, its control area is the entire phase diagram plane. When $A < D_{min}$, if the IRE center is located within ZMDE or outside of ZMDE and the minimum distance from the ZMDE is less than $D_{min}$, the control to increase the size of the IRE is required; Otherwise, there is no need to increase the IRE size control. Therefore, the control area on the phase diagram where the IRE size needs to be increased is defined as follows:

$0 \leq x_{ct} A + D_{min}$ and $y_{min}^{out}(x_{ct}) \leq y_{ct} \leq y_{min}^{out}(x_{ct})$;

$-A - D_{min} \leq x_{ct} < 0$ and $-y_{min}^{out}(-x_{ct}) \leq y_{ct} \leq y_{min}^{out}(-x_{ct})$.

After applying impulse adjustment to $x_{ct}$, the size of IRE may change, so that the adjusted x coordinate of the center of IRE may deviate from the desired position with respect to the new IRE, resulting in the dissatisfying maximum distance and minimum distance between the satellites. According to equation (9), given the center position $(x_{ct}, y_{ct})$ of IRE before adjustment and the x coordinate adjustment amount $\Delta x_{ct}$ of IRE center, the size of the adjusted ellipse is related to the coordinate position $(x_t, y_t)$ of the satellite during adjustment. In this embodiment, the coordinate position of the satellite at the time of impulse application is restricted so that the change of IRE size after adjustment does not affect the control target.

There are two requirements for limiting the size of the adjusted IRE. One is that the IRE cannot be increased, the other is that the IRE cannot be reduced. By comparing equations (8) and (9), it can be seen that, when $\Delta y_{ct}=0$, if the semi-minor axis A of IRE cannot be reduced after the given $\Delta x_{ct}$ is applied, it only needs to satisfy:

$$(x_t - x_{ct}) \cdot \Delta x_{ct} < 0 \tag{24}$$

According to the periodic motion characteristics of the satellite on IRE, half of the orbital cycle time can satisfy the timing condition of equation (24). On the other hand, if the semi-minor axis A of IRE cannot be reduced after the given $\Delta x_{ct}$ is applied, it needs to be satisfied:

$$|x_t - x_{ct}| \geq |x_t - x_{ct} - \Delta x_{ct}| \tag{25}$$

That is, it satisfies both $$(x_t - x_{ct}) \cdot \Delta x_{ct} > 0 \tag{26}$$

and $$|\Delta x_{ct}| \le 2|x_t - x_{ct}| \tag{27}$$

According to the periodic motion characteristics of the satellite on IRE, half of the orbital cycle time can satisfy the timing condition of equation (26). Since the maximum value of $|x_t - x_{ct}|$ is A, when $|\Delta x_{ct}|$ satisfies the following relation:

$$|\Delta x_{ct}| < 2A \tag{28}$$

Within half an orbital period satisfying the condition of equation (26), there is always a period of time, during which $|x_t - x_{ct}|$ approaches its maximum value A, and the condition of equation (27) can also be satisfied, so that the size of IRE does not increase after adjustment.

For the above minimum distance control strategy, the minimum distance between satellites is affected by the change of ZMDE size (which is the same as the IRE size) after the adjustment. When implementing the adjustment impulse, it is necessary to avoid that the adjusted minimum distance of the IRE is less than the expected value of the adjustment target due to changes in the size of the IRE. When the target position of IRE center adjustment is located in ZMDE, that is, for the second control area, the third control area, the fifth control area and the sixth control area, the size of IRE should not be reduced after adjustment. Therefore, it is only necessary to apply IRE center adjustment impulse when the condition of equation (24) is satisfied, and such control time must exist within one orbital period. When the target location of the IRE center adjustment is outside ZMDE, that is, for the first control area and the fourth control area, the size of the IRE should not be increased after adjustment. For the minimum distance control strategy of the first control area and the fourth control area, the x coordinate adjustment quantity of IRE center satisfies the restriction condition of equation (28). Therefore, the control impulse can be applied when the conditions of equation (26) and equation (27) are satisfied to ensure that the size of IRE will not increase.

For the maximum distance control strategy given above, it is required that IRE size A should not increase after the adjustment of $x_{ct}$, otherwise the increase of $d_{max}$ caused by the increase of A after adjustment may cause $d_{max} > D_{max}$. Considering that $|x_{ct}|$ is small when the satellites are in close relative motion, the adjustment amount $|\Delta x_{ct}|$ is also small, so the condition of equation (28) can be satisfied. If the $|x_{ct}|$ coordinate is too large at the beginning, the relative motion will drift too fast. It must be adjusted to a smaller value first, so that the relative motion will enter a slow drifting state of cluster flight. Therefore, as long as the maximum distance control impulse is applied when the conditions of equations (26) and (27) are satisfied, the size of IRE can be guaranteed not to increase.

According to the above analysis, the control impulse cannot be implemented immediately when the IRE center reaches the boundary between maximum distance control and minimum distance control. Instead, it must wait for the implementation time specified by the size limit of IRE, and this wait time should not exceed 1 orbital period at most. During this waiting time for the implementation time, the y coordinate of IRE center will shift, which may cause that IRE center has left the control area limited by the minimum distance control strategy when the control is implemented, thus imposing invalid control, or the distance constraint has been violated when the control is implemented. In order to avoid control failure caused by delayed implementation time of the IRE center adjustment impulse, the lead should be considered in the design of distance control strategy. The method is to move forward the drift distance of the center y coordinate of IRE in 1 orbital period on the starting boundary of various control areas, namely the minimum distance control starting curve mentioned above, along the direction opposite to the direction of the phase diagram trajectory of the IRE center. According to equation (3), the drift distance is $3\pi x_{ct}$. Therefore, the starting curves of various IRE central control areas considering the lead can be uniformly expressed as:

$$y_{ct} = y_B(x_{ct}) + 3\pi x_{ct} \tag{29}$$

Where, $y_B(x_{ct})$ is the maximum distance control boundary function and the control starting curve function of the six minimum distance control areas. $\pi$ represents the PI constant. In the control method for changing the size of IRE given above, the control area for reducing the size of IRE is the whole phase plane, while the control of increasing the size of IRE has no implementation time limit, so there is no need to consider the lead for changing the size of IRE.

Further, the realizable conditions of distance keeping control are demonstrated as follows:

According to the design of the maximum control strategy, when $D_{min} > 2A$, the IRE center can be made to enter $x_{ct} = \pm \varepsilon_x$ by one impulse adjustment of $x_{ct}$, and:

$$-y_{max}(-\varepsilon_x) \le y_{ct} \le y_{max}(-\varepsilon_x) \tag{30}$$

The determined range of steady-state trajectory with upper bound and the quasi-periodic impulse control is used to make the IRE center circulate on the steady-state trajectory and achieve the maximum distance maintenance. When $D_{max} < 2A$, the IRE size needs to be reduced to $2A < D_{max}$ before the maximum distance can be maintained.

According to the design of the minimum distance control strategy, when $A > D_{min}$, the IRE center can be made to enter $x_{ct} = \pm \varepsilon_x$, by one impulse adjustment of $x_{ct}$ (may be assisted by other emergency response collision avoidance controls), and:

$$y_{ct} \le -2A - D_{min} \vee y_{ct} \ge 2A + D_{min} \tag{31}$$

Where, $\vee$ represents logic or operation. Or enter $x_{ct} = \pm \varepsilon_x$ and $$-y_{min}^{in}(\varepsilon_x) \le y_{ct} \le y_{min}^{in}(\varepsilon_x) \tag{32}$$

The minimum distance determined is on the steady-state trajectory with lower bound; When $A < D_{min}$, in order to ensure that the inter-satellite distance is not less than the lower bound $D_{min}$, the IRE center can only enter the range of steady-state trajectory defined by equation (31).

The inter-satellite distance can be kept within the range between $D_{min}$ and $D_{max}$ only when the steady-state trajectories of the maximum distance control and minimum distance control have intersection. At this point, according to the natural trajectory motion and control strategy design of the phase diagram, no matter where the center of IRE of the two satellites is located initially, under the action of the given control strategy, the center trajectory of the IRE will inevitably reach one of the three steady-state control loops corresponding to the intersection of the steady-state trajectories of the maximum distance control and the minimum distance control, and then move cyclically along it. Among the three steady-state control loops, one is located inside the ZMDE, and the other two are located on the upper and lower sides outside the ZMDE. In FIG. 3, the composition and position of the three steady-state control loops are shown by the bolded vertical dashed arrow line segment (located on the natural trajectory of $x_{ct}=\pm\varepsilon_x$) and the bolded horizontal dashed arrow line with dots at the beginning end (control adjustment line).

The conditions that can guarantee the existence of two steady-state control loops outside ZMDE are:

$$D_{max}>2A/\backslash 2A+D_{min}<y_{max}(-\varepsilon_x) \quad (33)$$

Where, $\wedge$ represents logic and operation.

Considering that $\varepsilon_x$ is small, there is $y_{max}(-\varepsilon_x) \approx D_{max}-2A$, so the condition of equation (33) can be approximated as:

$$D_{max}-2A>2A+D_{min} \quad (34)$$

The conditions that can guarantee the existence of steady-state control loop in ZMDE are:

$$D_{max}>2A/\backslash A>D_{min} \quad (35)$$

It can be seen that as long as one of the conditions in equations (33) and (35) is satisfied, distance keeping control is achievable. The above conditions also indicate that only when $D_{max}>5D_{min}$, there is a suitable A to satisfy both equations (34) and (35), that is, only when both internal and external steady-state control loop can exist simultaneously. When $5D_{min} \geq D_{max}>2D_{min}$, for the same A, only one of equations (34) and (35) can be satisfied at most, that is, only one of the internal and external steady-state control loops can exist at the same time. When $2D_{min} \geq D_{max}>D_{min}$, only equation (34) can be satisfied, that is, only the external steady-state control loop can exist. Thus, as long as $D_{max}>D_{min}$ is satisfied, the inter-satellite distance can be kept within the range between $D_{min}$ and $D_{max}$ theoretically by means of IRE size adjustment control, the maximum distance control strategies, and the minimum distance control strategies.

In a complete embodiment, the cluster flight of two satellites near a circular reference orbit at a height of 500 km is considered. Among them, the reference satellite moves freely on the reference orbit, and the initial orbital elements of the given reference orbit are as follows: the semi-major axis is 6878137 m, the eccentricity is 0, the orbital inclination is pi/6, the right ascension of the ascending node is pi/3, the argument of latitude is 0. Set the minimum safe distance between satellites $D_{min}=30$ m. It is assumed that the initial position and initial velocity of the companion satellite relative to the reference satellite in the x and y directions in the LVLH coordinate system meet the conditions of closed elliptic relative motion, but the initial IRE center coordinates of the companion satellite relative to the reference satellite in the x-y plane deviate from the origin to different degrees. In order to evaluate the performance of the algorithm under different conditions, Latin hypercube sampling was used to randomly generate parameters such as maximum distance between satellites, initial position coordinate of companion satellite, initial IRE center coordinate of companion satellite, etc. 300 sample examples of different parameter values were obtained, and simulation calculation and statistics were carried out. Where, the initial values of x, y and z coordinates of the companion satellite in the coordinate system of the reference satellite LVLH are [−150, 150] m, [−300, 300] m and [−300, 300] m respectively. The values of x coordinates and y coordinates of the initial IRE center are [−60, 60] m and [−180, 180] m respectively. The maximum distance between satellites in the x-y plane is $D_{max}$[100, 200] m. The initial velocity of the companion satellite relative to the reference in the x-y plane of the LVLH coordinate system is determined by the relative motion condition of the closed ellipse, and the initial velocity in the z direction is set to be a) times of the initial value of the z coordinate.

To simplify the calculation, the maximum and minimum distance control boundary functions given in FIG. 3 are approximated. For the calculation of the maximum distance control boundary, when the center of IRE is located in the second quadrant, the distance between the highest point on IRE and the origin is approximately the maximum distance between the satellites; when the center of IRE is located in the fourth quadrant, the distance between the lowest point on IRE and the origin is approximately the maximum distance between the satellites, namely, $y_{max}(x_{ct}) \approx \sqrt{D_{max}^2-x_{ct}^2}-2A$ and the approximate value of the maximum IRE distance at this time is $d_{max} \approx \sqrt{x_{ct}^2+(|y_{ct}|+2A)^2}$. For the calculation of the minimum distance control in boundary, $y_{min}^{in}(x_{ct})$ is approximated by the first quadrant part of the ellipse with the minor axis length $A-D_{min}$ and the major axis length $2A-D_{min}$, that is, $y_{min}^{in}(x_{ct}) \approx (2A-D_{min})\sqrt{1-x_{ct}^2/(A-D_{min})^2}$; $y_{min}^{out}(x_{ct})$ is approximated by the first quadrant part of the ellipse with the minor axis length $A+D_{min}$ and the major axis length $2A+D_{min}$, that is, $y_{min}^{out}(x_{ct}) \approx (2A+D_{min})\sqrt{1-x_{ct}^2/(A-D_{min})^2}$. The above approximate treatment has small error for the problem under consideration, and the associated flight does not require strict relative motion configuration, so it is not necessary to calculate these control boundary functions with high precision. In the algorithm implementation, the preset offset of x coordinate of IRE center in the maximum distance control strategy and minimum distance control strategy is $\varepsilon_x=2$ m.

Based on the given initial conditions and algorithm parameters, the relative motion of each sample within 864000 s (10 days) was simulated. In the simulation example, the control condition is checked, the velocity impulse is calculated and applied at each discrete time with a fixed time step of 100 s. Before the simulation starts, the initial conditions of the satellite's relative motion are transformed into the Earth Centered Inertial (ECI) coordinate system. For each discrete impulse calculation moment in the simulation, the instantaneous ECI state of the companion satellite was first converted into the relative motion state in the coordinate system of the reference satellite LVLH, then the velocity impulse needed to be applied to the companion satellite was calculated according to the relative motion control strategy, and the control velocity impulse was converted back to the ECI coordinate system and applied to the companion satellite. In the time period between two adjacent discrete moments, the numerical integration of the orbital motion model with J2 perturbation is used to calculate the free orbit motion of each satellite. The numerical integration is based on the variable step size algorithm, and the absolute and relative error limits are set to 1e−10.

Figure 4:
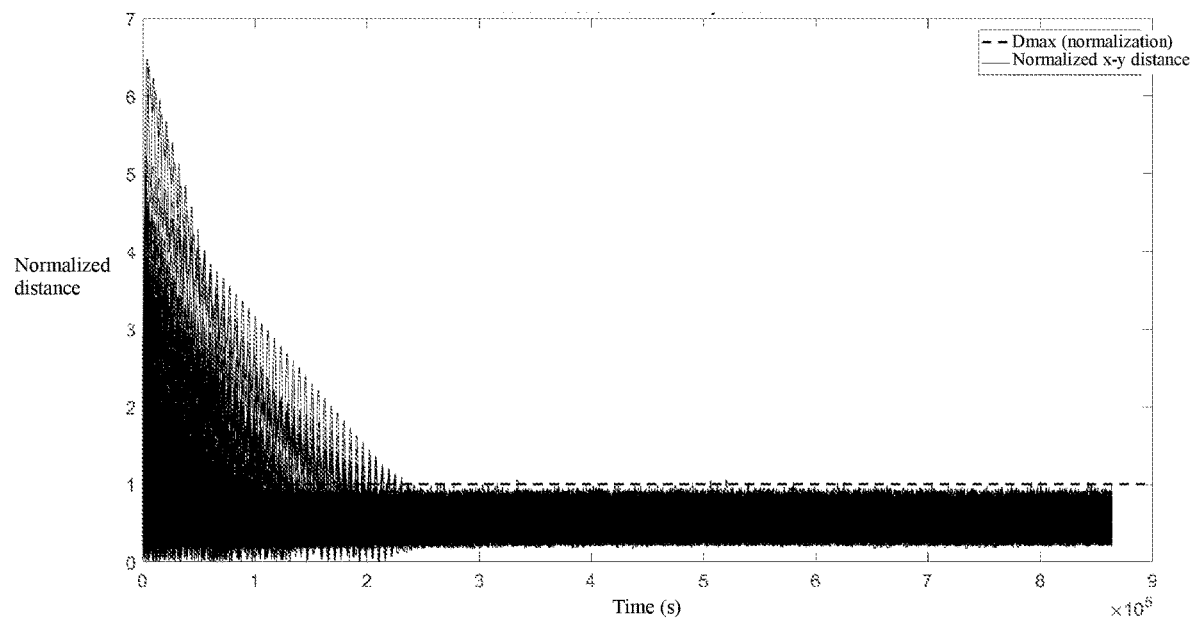
FIG. 4 is a schematic diagram of the change of normalized distance with time in the x-y plane of 300 sample examples provided for the preferred embodiment of the invention.
Figure 5:
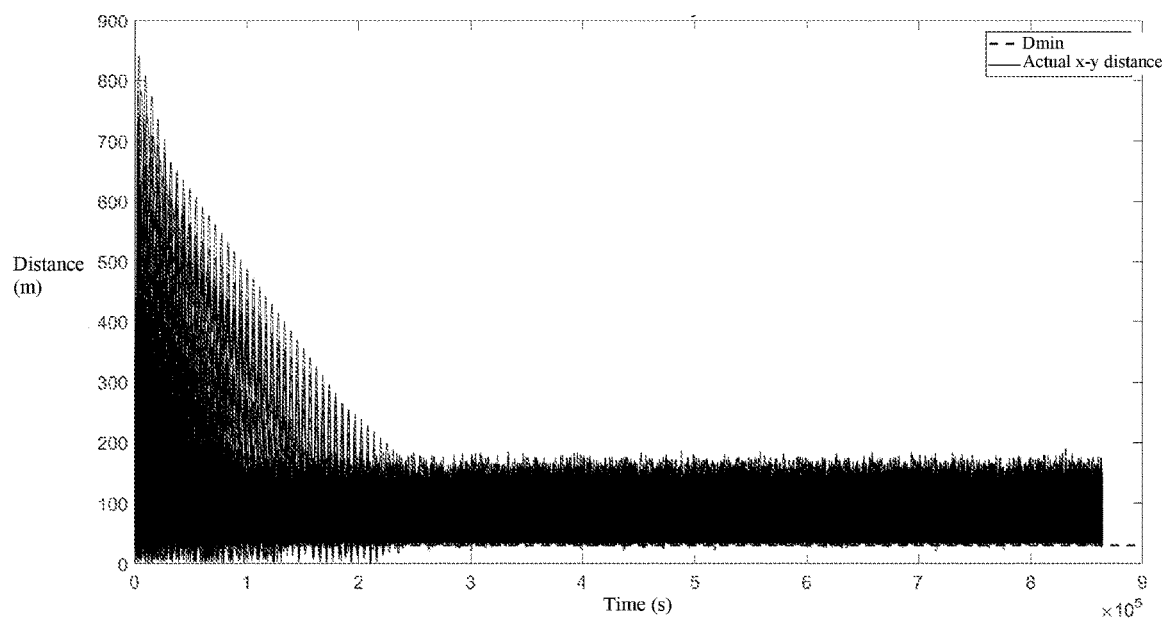
FIG. 5 is a schematic diagram of the actual distance change with time in the x-y plane of 300 sample examples provided for the preferred embodiment of the invention.

FIG. 4 shows the variation of the normalized inter-satellite distance in the x-y coordinate plane of 300 sample examples. Each curve in the figure represents the variation of the normalized inter-satellite distance in a sample example over time. The normalization method is to divide the actual inter-satellite distance in the x-y coordinate plane by the D value of the example. Its purpose is to centrally display how the algorithm satisfies the maximum distance constraint under different parameters. The horizontal dashed line in the figure represents the normalized maximum distance threshold curve, that is, the normalized distance is equal to 1. FIG. 5 shows the change of actual inter-satellite distance over time in the x-y coordinate plane of 300 sample examples. Each curve in the figure represents the change of actual inter-satellite distance over time of one sample example, and the horizontal dashed line in the figure is the minimum distance threshold. As can be seen from FIG. 4 and FIG. 5, the proposed algorithm can effectively adjust and control the relative motion of the satellite from the initial randomly generated state to the set distance range, that is, realize long-term relative distance control. In FIG. 4 and FIG. 5, the initial relative motion control violated the distance constraint because the initial state was generated randomly and did not conform to the range constraint. In the process and later stage of relative motion control, there will be a small amplitude beyond the distance range at some moments, which is caused by the existence of perturbation and the approximate simplified calculation in the algorithm implementation, which does not affect the practical application effect of the algorithm.

The total number of control velocity impulses of three different functions (i.e. IRE size adjustment control impulse in x direction, maximum distance control impulse in y direction and minimum distance control impulse in y direction), the sum of the absolute values of each impulse of three different function control impulses, the total number of all control impulses and the sum of the absolute values of all control impulses are taken as statistics. Table 1 shows the velocity impulse statistics of distance control for 300 sample examples within 10 days, and gives the maximum value, average value and sample standard deviation of corresponding statistics. It can be seen that the velocity impulse requirement of the given distance control method is quite small (the maximum value of the total velocity impulse within 10 days is only about 0.83 m/s, and the average value is about 0.28 m/s). The maximum number of impulse control required by this method is 189 times (average 51 times) within 10 days (about 152 orbital periods), and the maximum number of impulse control required for each orbital period is about 1.24 times (average about 0.34 times), and the required control frequency is also low.

TABLE 1

Statistical table of control velocity impulse of 300 sample examples

| | Total velocity impulse absolute value statistics (m/s) | | | | Velocity impulse number statistics (times) | | | |
| --- | --- | --- | --- | --- | --- | --- | --- | --- |
| Sample statistics | x direction (IRE size adjustment) | y direction (maximum distance control) | y direction (minimum distance control) | Sum of absolute values of all control impulses | x direction (ellipse size adjustment) | y direction (maximum distance control) | y direction (minimum distance control) | Sum of all control impulse times |
| Maximum value | 0.5025 | 0.3400 | 0.0745 | 0.8327 | 43 | 139 | 35 | 189 |
| Average value | 0.1629 | 0.0771 | 0.0403 | 0.2804 | 5.97 | 27.32 | 18.04 | 51.34 |
| Standard deviation | 0.1083 | 0.0589 | 0.0120 | 0.1506 | 8.8217 | 24.92 | 5.15 | 33.01 |

In the 300 sample examples, two typical sample points are selected to give the specific calculation results. The parameter values of two typical sample points are shown in Table 2.

TABLE 2

Parameter values of two typical sample points selected in sample examples

| Serial No. | Initial relative position x coordinate | Initial relative position y coordinate | Initial relative position z coordinate | Initial IRE center x coordinate | Initial IRE center y coordinate | $D_{max}$ |
| --- | --- | --- | --- | --- | --- | --- |
| 1 | −91.5488 | −52.3394 | 219.4925 | 2.6560 | −111.3994 | 165.8829 |
| 2 | 29.1328 | −47.5050 | −143.3407 | 21.3899 | −5.8358 | 108.1676 |

Figure 6:
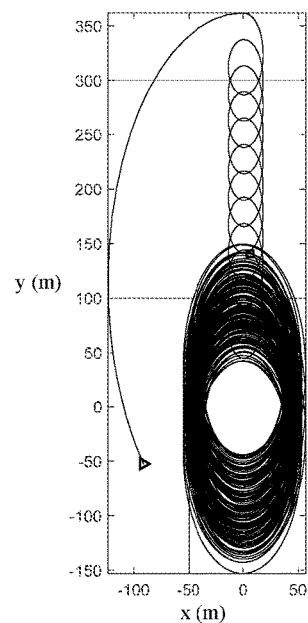
FIG. 6 is the relative motion of the x-y plane of the first typical sample calculation example provided for the preferred embodiment of the invention.
Figure 7A:
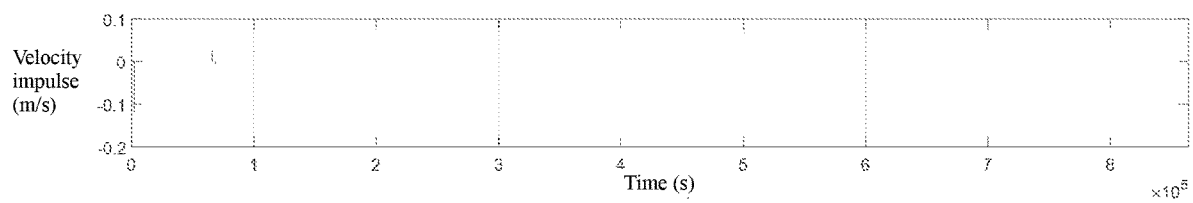
FIGS. 7A-7C show three control velocity impulses of the first typical sample example for the preferred embodiment of the invention.
Figure 7B:
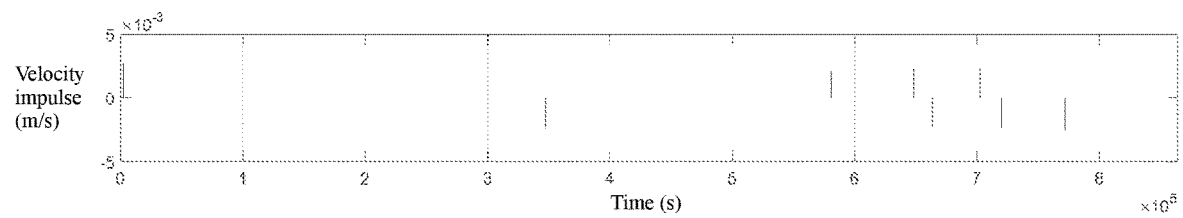
Figure 7C:
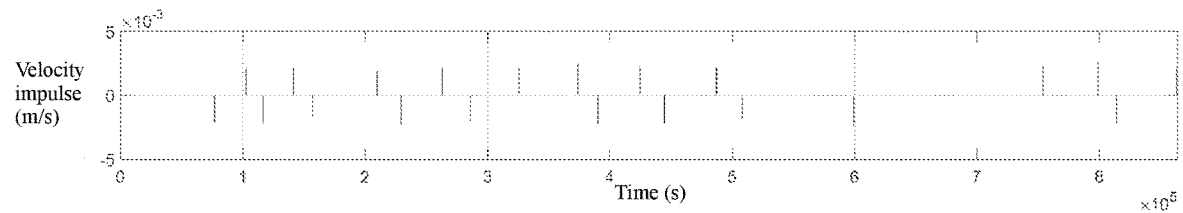
Figure 8:
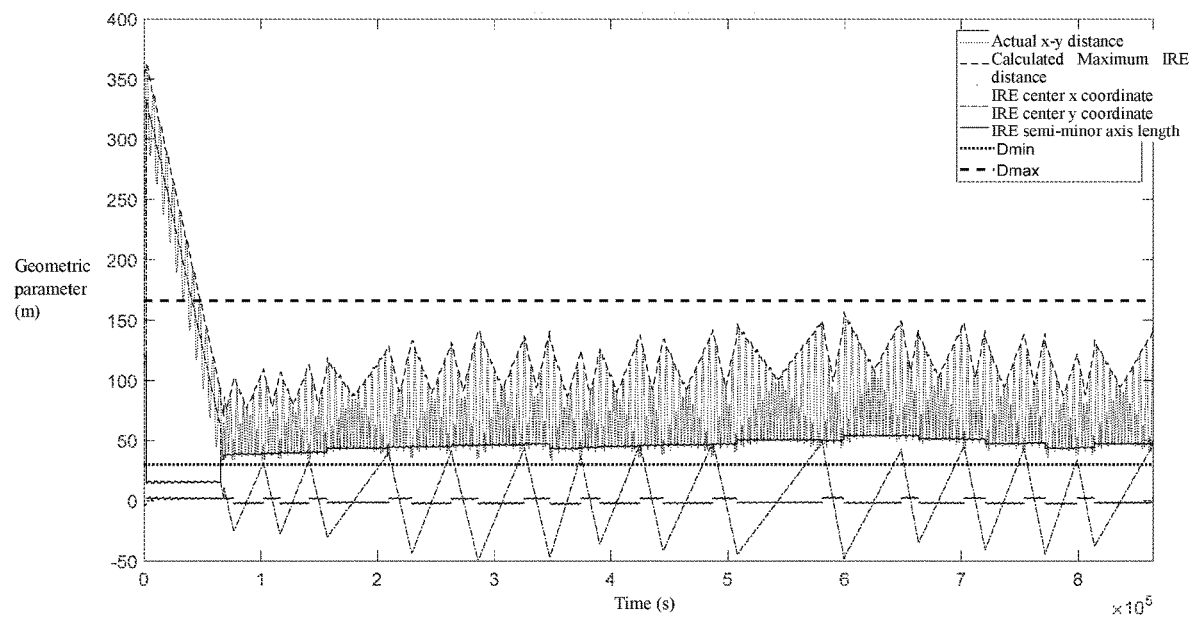
FIG. 8 is the variation of relative motion geometric parameters of the first typical sample example provided for the preferred embodiment of the invention.
Figure 9:
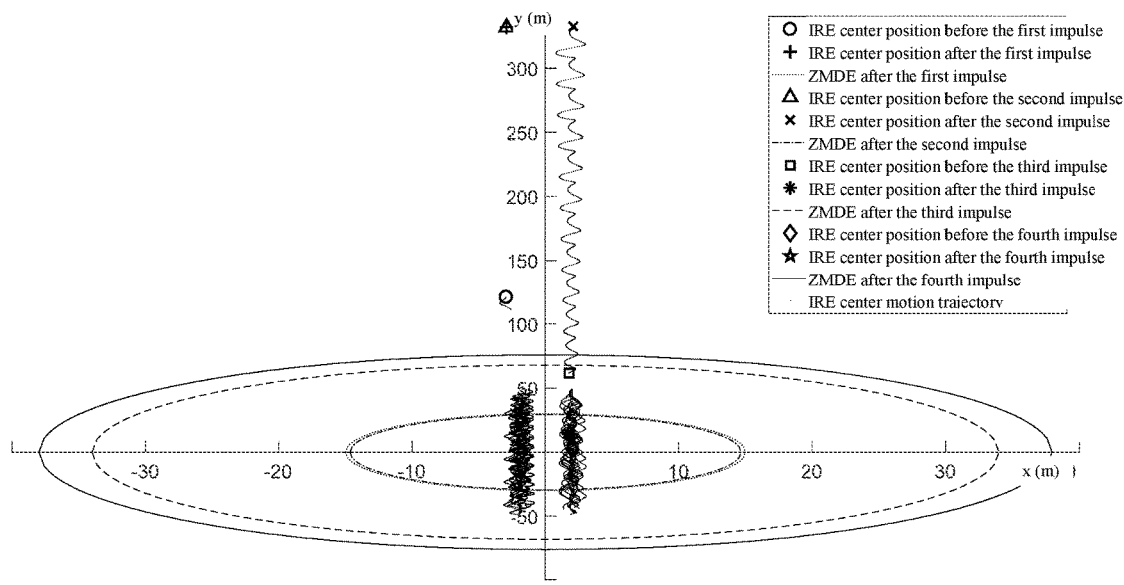
FIG. 9 is IRE center phase diagram motion of the first typical sample example provided for the preferred embodiment of the invention.
Figure 10:
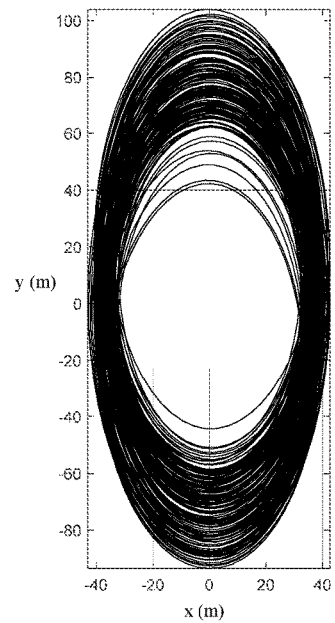
FIG. 10 is the relative motion of the x-y plane of the second typical sample calculation example provided for the preferred embodiment of the invention.
Figure 11A:
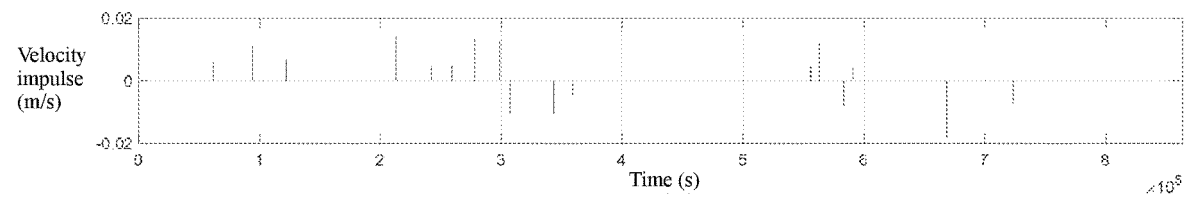
FIGS. 11A-11C show three control velocity impulses of the second typical sample example for the preferred embodiment of the invention.
Figure 11B:
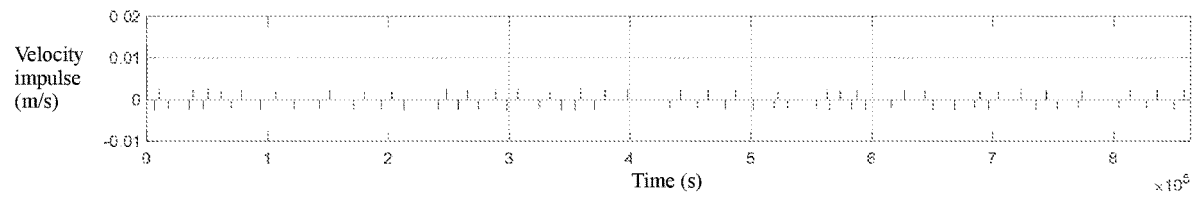
Figure 11C:
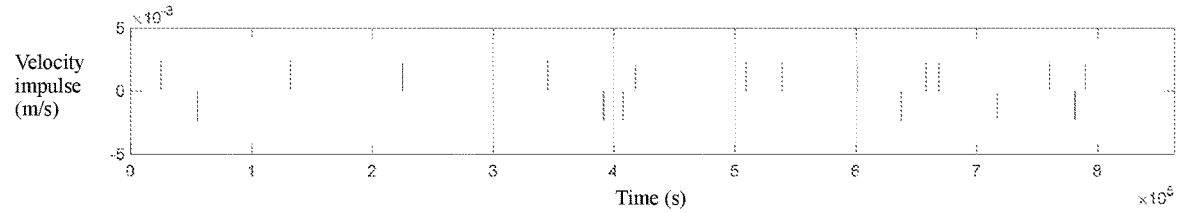
Figure 12:
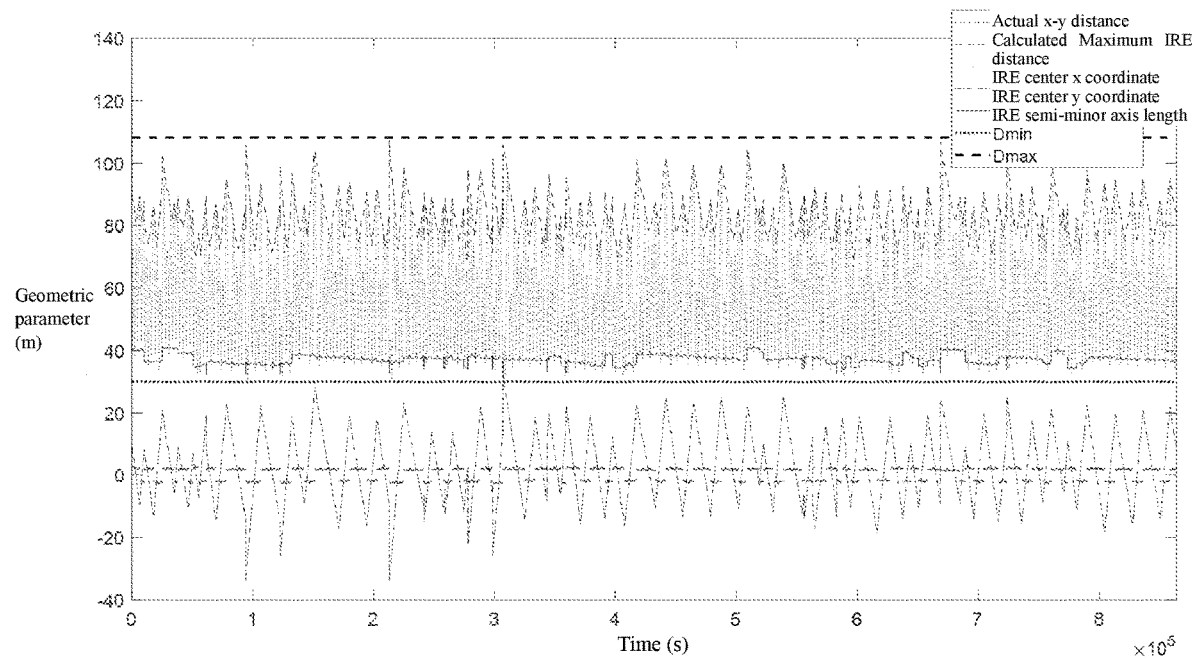
FIG. 12 is the variation of relative motion geometric parameters of the second typical sample example provided for the preferred embodiment of the invention.
Figure 13:
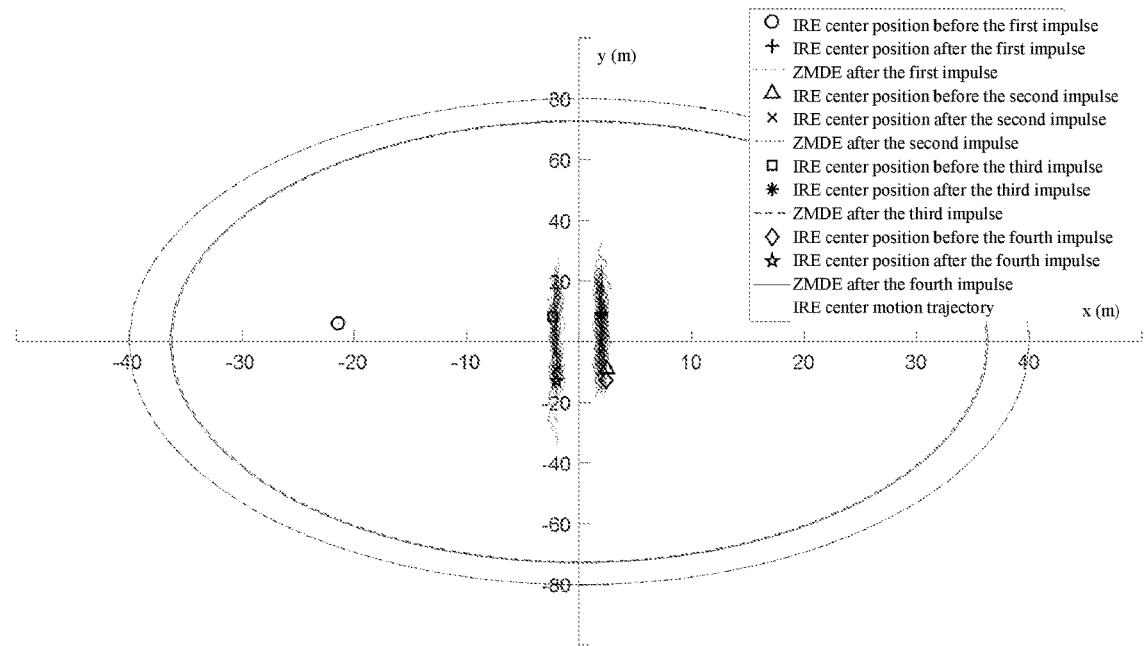
FIG. 13 is IRE center phase diagram motion of a second typical sample calculation provided for a preferred embodiment of the invention.

The simulation results of two typical sample point examples are shown in FIGS. 6-13. In FIGS. 6 and 10, the triangle symbol represents the initial relative position, and the square symbol represents the relative position at the end of the simulation. The height values and signs in FIGS. 7A-7C and 11A-11C represent the magnitude and direction of the impulse respectively. The ellipses of different lineaments in FIGS. 9 and 13 respectively represent the ZMDE at the end of the first 4 impulse controls; symbols of different shapes mark the position of IRE center before and at the end of the first 4 impulse controls; small dot symbols mark the movement trajectory of IRE center.

The application embodiment also provides a distance control system for relative motion between satellites, including a memory, a processor and a computer program stored on a memory and operable on a processor. The processor executes the computer program to implement the steps of the method mentioned above. The system can realize all embodiments of the distance control method of relative motion between satellites above, and can achieve the same beneficial effect, which will not be described here.

Preferred concrete embodiments of the invention are described in detail above. It should be understood that the ordinary technician in the field can make many modifications and changes according to the idea of the invention without creative labor. Therefore, any technical solution which can be obtained by a technical person in the technical field on the basis of the prior art by logical analysis, reasoning or limited experiments according to the conception of the invention shall be within the scope of protection determined by the claims.

What is claimed is:

1. A distance control method of relative motion between satellites, comprising:

determining a reference satellite and a companion satellite, and establishing local vertical, local horizontal (LVLH) coordinates with the reference satellite as a center origin; dividing the LVLH coordinates into U quadrant areas in a set plane, wherein U is a positive integer;

determining an instantaneous relative ellipse (IRE) and coordinates $(x_{ct}, y_{ct})$ of an IRE center, and determining Q first target control areas and W second target control areas according to a position relation between the coordinates $(x_{ct}, y_{ct})$ of the IRE center and the U quadrant areas, wherein Q and W are positive integers, and the IRE is used to represent a motion trajectory between the companion satellite and the reference satellite, wherein the W second target control areas comprise a first control area, a second control area, a third control area, a fourth control area, a fifth control area and a sixth control area;

a starting curve of the first control area is $y_{ct}=2A+D_{min}$, and an ending curve of the first control area is $y_{ct}=2A$;

a starting curve of the second control area is $y_{ct}=y_{min}^{out,b}(x_{ct})$, and an ending curve of the second control area is $y_{ct}=y_{min}^{out,e}(x_{ct})$;

a starting curve of the third control area is $y_{ct}=y_{min}^{in,b}(x_{ct})$, and an ending curve of the third control area is $y_{ct}=y_{min}^{in,e}(x_{ct})$;

a starting curve of the fourth control area is $y_{ct}=-2A-D_{min}$, and an ending curve of the fourth control area is $y_{ct}=-2A$;

a starting curve of the fifth control area is $y_{ct}=-y_{min}^{out,b}(-x_{ct})$, and an ending curve of the fifth control area is $y_{ct}=-y_{min}^{out,e}(-x_{ct})$; and a starting curve of the sixth control area is $y_{ct}=-y_{min}^{in,b}(-x_{ct})$, and an ending curve of the sixth control area is $y_{ct}=-y_{min}^{in,e}(-x_{ct})$;

wherein, A represents a semi-minor axis length of the IRE, $D_{min}$ represents a minimum safe distance between two satellites set, $y_{min}^{out,b}(x_{ct})$ represents a function defining a minimum distance control starting curve outside a zero minimum distance ellipse (ZMDE), $y_{min}^{out,e}(x_{ct})$ represents a function defining a minimum distance control ending curve outside the ZMDE, $y_{min}^{in,b}(x_{ct})$ represents a function defining a minimum distance control starting curve inside the ZMDE, $y_{min}^{in,e}(x_{ct})$ represents a function defining a minimum distance control ending curve inside the ZMDE;

reducing a distance between the companion satellite and the reference satellite according to a first position relation between the coordinates of the IRE center and the Q first target control areas; and increasing the distance between the companion satellite and the reference satellite according to a second position relation between the center coordinates of the IRE and the W second target control areas.

2. The distance control method according to claim 1, wherein the U quadrant areas comprises a first quadrant area, a second quadrant area, a third quadrant area and a fourth quadrant area; and the step of reducing distance between the companion satellite and the reference satellite according to the first position relation comprises:

adjusting $x_{ct}$ in the coordinates of the IRE center to $-x_{ct}$ when the IRE center is in an area of $x_{ct} \leq 0$ and $y_{ct} \geq y_{max}(x_{ct})$, or is in an area of $x_{ct} > 0$ and $y_{ct} \leq -y_{max}(-x_{ct})$, wherein $y_{max}(x_{ct})$ is a maximum distance boundary function.

3. The distance control method according to claim 1, wherein the step of increasing distance between the companion satellite and the reference satellite according to the second position relation comprises:

when the IRE center is located in a control area of a first part, adjusting $x_{ct}$ to be a first preset value; and when the IRE center is located in a control area of a second part, adjusting $x_{ct}$ to be a second preset value;

wherein, the control area of the first part is part of a control area of the W second target control areas, and the control area of the second part is the remaining control area except the control area of the first part in the W second target control areas.

4. The distance control method according to claim 1, wherein the step of increasing the distance between the companion satellite and the reference satellite according to the second position relation comprises:

when the IRE center is located in the first control area, the third control area or the fifth control area, adjusting $x_{ct}$ to be a first preset value; and when the IRE center is located in the second control area, the fourth control area or the sixth control area, adjusting $x_{ct}$ to be a second preset value.

5. The distance control method according to claim 1, wherein before reducing the distance between the companion satellite and the reference satellite according to the first position relation, the distance control method further comprises:

determining a first target time period to perform a reduction in the distance between the companion satellite and the reference satellite and a second target time period to perform an increase in the distance between the companion satellite and the reference satellite, wherein in the first target time period and the second target time period, a change in a size of the IRE resulting from adjustment of the coordinates of the IRE center is within a preset range;

the step of reducing distance between the companion satellite and the reference satellite according to the first position relation comprises:

reducing the distance between the companion satellite and the reference satellite during the first target time period;

the step of increasing the distance between the companion satellite and the reference satellite according to the second position relation comprises:

increasing the distance between the companion satellite and the reference satellite during the second target time period.

6. A distance control system for relative motion between satellites, comprising a memory, a processor and a computer program stored on the memory and run on the processor, wherein the processor implements the steps of the method of claim 1 when executing the computer program.

7. The distance control system according to claim 6, wherein the U quadrant areas comprises a first quadrant area, a second quadrant area, a third quadrant area and a fourth quadrant area; and the step of reducing distance between the companion satellite and the reference satellite according to the first position relation comprises:

adjusting $x_{ct}$ in the coordinates of the IRE center to $-x_{ct}$ when the IRE center is in an area of $x_{ct} \leq 0$ and $y_{ct} \geq y_{max}(x_{ct})$, or is in an area of $x_{ct} > 0$ and $y_{ct} \leq -y_{max}(-x_{ct})$, wherein $y_{max}(x_{ct})$ is a maximum distance boundary function.

8. The distance control system according to claim 6, wherein the step of increasing distance between the companion satellite and the reference satellite according to the second position relation comprises:

when the IRE center is located in a control area of a first part, adjusting $x_{ct}$ to be a first preset value; and when the IRE center is located in a control area of a second part, adjusting $x_{ct}$ to be a second preset value;

wherein, the control area of the first part is part of a control area of the W second target control areas, and the control area of the second part is the remaining control area except the control area of the first part in the W second target control areas.

9. The distance control system according to claim 6, wherein the W second target control areas comprise a first control area, a second control area, a third control area, a fourth control area, a fifth control area and a sixth control area;

a starting curve of the first control area is $y_{ct} = 2A + D_{min}$, and an ending curve of the first control area is $y_{ct} = 2A$;

a starting curve of the second control area is $y_{ct} = y_{min}(x_{ct})$, and an ending curve of the second control area is $y_{ct} = y_{min}^{out,e}(-x_{ct})$;

a starting curve of the third control area is $y_{ct} = y_{min}^{in,b}(x_{ct})$, and an ending curve of the third control area is $y_{ct} = y_{min}^{in,e}(x_{ct})$;

a starting curve of the fourth control area is $y_{ct} = -2A - D_{min}$, and an ending curve of the fourth control area is $y_{ct} = -2A$;

a starting curve of the fifth control area is $y_{ct} = -y_{min}^{out,b}(-x_{ct})$, and an ending curve of the fifth control area is $y_{ct} = -y_{min}^{out,e}(-x_{ct})$; and a starting curve of the sixth control area is $y_{ct} = -y_{min}^{in,b}(-x_{ct})$, and an ending curve of the sixth control area is $y_{ct} = -y_{min}^{in,e}(-x_{ct})$;

wherein, A represents a semi-minor axis length of the IRE, $D_{min}$ represents a minimum safe distance between two satellites set, $y_{min}(x_{ct})$ represents a function defining a minimum distance control starting curve outside a zero minimum distance ellipse (ZMDE), $y_{min}^{out,e}(x_{ct})$ represents a function defining a minimum distance control ending curve outside the ZMDE, $y_{min}^{in,b}(x_{ct})$ represents a function defining a minimum distance control starting curve inside the ZMDE, $y_{min}^{in,e}(x_{ct})$ represents a function defining a minimum distance control ending curve inside the ZMDE.

10. The distance control system according to claim 9, wherein the step of increasing the distance between the companion satellite and the reference satellite according to the second position relation comprises:

when the IRE center is located in the first control area, the third control area or the fifth control area, adjusting $x_{ct}$ to be a first preset value; and when the IRE center is located in the second control area, the fourth control area or the sixth control area, adjusting $x_{ct}$ to be a second preset value.

11. The distance control system according to claim 6, wherein before reducing the distance between the companion satellite and the reference satellite according to the first position relation, the distance control method further comprises:

determining a first target time period to perform a reduction in the distance between the companion satellite and the reference satellite and a second target time period to perform an increase in the distance between the companion satellite and the reference satellite, wherein in the first target time period and the second target time period, a change in a size of the IRE resulting from adjustment of the coordinates of the IRE center is within a preset range;

the step of reducing distance between the companion satellite and the reference satellite according to the first position relation comprises:

reducing the distance between the companion satellite and the reference satellite during the first target time period;

the step of increasing the distance between the companion satellite and the reference satellite according to the second position relation comprises:

increasing the distance between the companion satellite and the reference satellite during the second target time period.

* * * * *